«12» United States Patent
Kelleher et al.

(10) Patent No.: US 9,120,202 B2
(45) Date of Patent: Sep. 1, 2015

(54) SHIELD ASSEMBLY FOR A POWER TOOL

(75) Inventors: Joseph P. Kelleher, Parkville, MD (US);
Earnest N. Copeland, Jr., Abingdon, MD (US); Craig A. Schell, Street, MD (US); Paul K. Trautner, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 664 days.

(21) Appl. No.: 13/534,708

(22) Filed: Jun. 27, 2012

(65) Prior Publication Data
US 2013/0000935 A1 Jan. 3, 2013

Related U.S. Application Data

(60) Provisional application No. 61/503,115, filed on Jun. 30, 2011.

(51) Int. Cl.
*B24B 55/05* (2006.01)
*B24B 55/04* (2006.01)
*B24B 23/02* (2006.01)

(52) U.S. Cl.
CPC ............. *B24B 55/052* (2013.01); *B24B 23/028* (2013.01); *B24B 55/04* (2013.01)

(58) Field of Classification Search
CPC ...... B24B 55/04; B24B 55/05; B24B 55/052; B24B 23/00; B24B 23/02; B24B 23/028; B23Q 11/06
USPC ......... 451/358, 359, 353, 355, 344, 451, 454; 30/391; 173/1, 46, 198, 171
See application file for complete search history.

(56) References Cited

U.S. PATENT DOCUMENTS

| 4,574,649 | A | | 3/1986 | Seol | |
| 4,924,635 | A | | 5/1990 | Rudolf | |
| 5,005,321 | A | * | 4/1991 | Barth et al. | 451/359 |
| 5,075,976 | A | | 12/1991 | Young | |
| 5,384,985 | A | | 1/1995 | Jacobsson | |
| 5,637,035 | A | | 6/1997 | Yee | |
| 5,766,062 | A | * | 6/1998 | Edling | 451/451 |
| 6,464,573 | B1 | * | 10/2002 | Keller | 451/451 |
| 6,699,114 | B1 | * | 3/2004 | Booeshaghi et al. | 451/451 |
| 6,893,334 | B1 | | 5/2005 | Stivers | |
| 6,949,017 | B2 | * | 9/2005 | Koschel et al. | 451/358 |
| 6,988,939 | B2 | | 1/2006 | Hoffmann | |
| 7,059,947 | B2 | | 6/2006 | Crover | |

(Continued)

FOREIGN PATENT DOCUMENTS

| DE | 3913898 | 10/1990 |
| DE | 10158334 | 2/2003 |
| EP | 1618990 | 1/2006 |

*Primary Examiner* — Scott A. Smith
(74) *Attorney, Agent, or Firm* — Amir R. Rohani; Scott Markow

(57) ABSTRACT

The present invention is directed toward a shield assembly for a handheld tool device such as an angle grinder. The shield assembly is selectively repositionable with respect to the cutting tool. A lock mechanism secures the shield assembly in discrete rotational positions relative to the cutting tool. The shield assembly includes a guard member and a bumper member, and an alignment feature configured to align the relative positions of guard member and the bumper member, thereby positing the members in a predetermined relative orientation. With this configuration, the shield assembly is selectively repositionable via a "hands-free" mechanism that permits a user to adjust the position of the shield assembly by simply contacting the shield assembly against a work surface.

20 Claims, 37 Drawing Sheets

(56) References Cited

U.S. PATENT DOCUMENTS

| | | |
|---|---|---|
| 7,063,606 B2 | 6/2006 | Stierle |
| 7,131,897 B2 | 11/2006 | Crover |
| 7,175,513 B2 * | 2/2007 | Folin .......................... 451/359 |
| 7,311,589 B2 | 12/2007 | Wiker |
| 7,524,239 B2 | 4/2009 | Schmidberger-Brinek |
| 7,892,075 B2 * | 2/2011 | Esenwein .................... 451/451 |
| 7,909,680 B2 * | 3/2011 | Boeck et al. ................. 451/344 |
| 8,282,446 B2 * | 10/2012 | Sulea et al. .................. 451/451 |
| 8,454,412 B2 * | 6/2013 | Esenwein .................... 451/359 |
| 8,523,640 B2 * | 9/2013 | Esenwein .................... 451/451 |
| 8,562,395 B2 * | 10/2013 | Boeck et al. ................. 451/451 |
| 2007/0117499 A1 | 5/2007 | Chen |
| 2008/0280549 A1 | 11/2008 | Sulea |
| 2009/0029635 A1 | 1/2009 | Boeck |
| 2009/0098812 A1 | 4/2009 | Boeck |
| 2009/0100885 A1 | 4/2009 | Boeck |
| 2009/0130961 A1 | 5/2009 | Boeck |
| 2009/0209184 A1 | 8/2009 | Esenwein |
| 2009/0311953 A1 | 12/2009 | Maute |
| 2010/0105300 A1 | 4/2010 | Esenwein |
| 2010/0178857 A1 | 7/2010 | Esenwein |

* cited by examiner

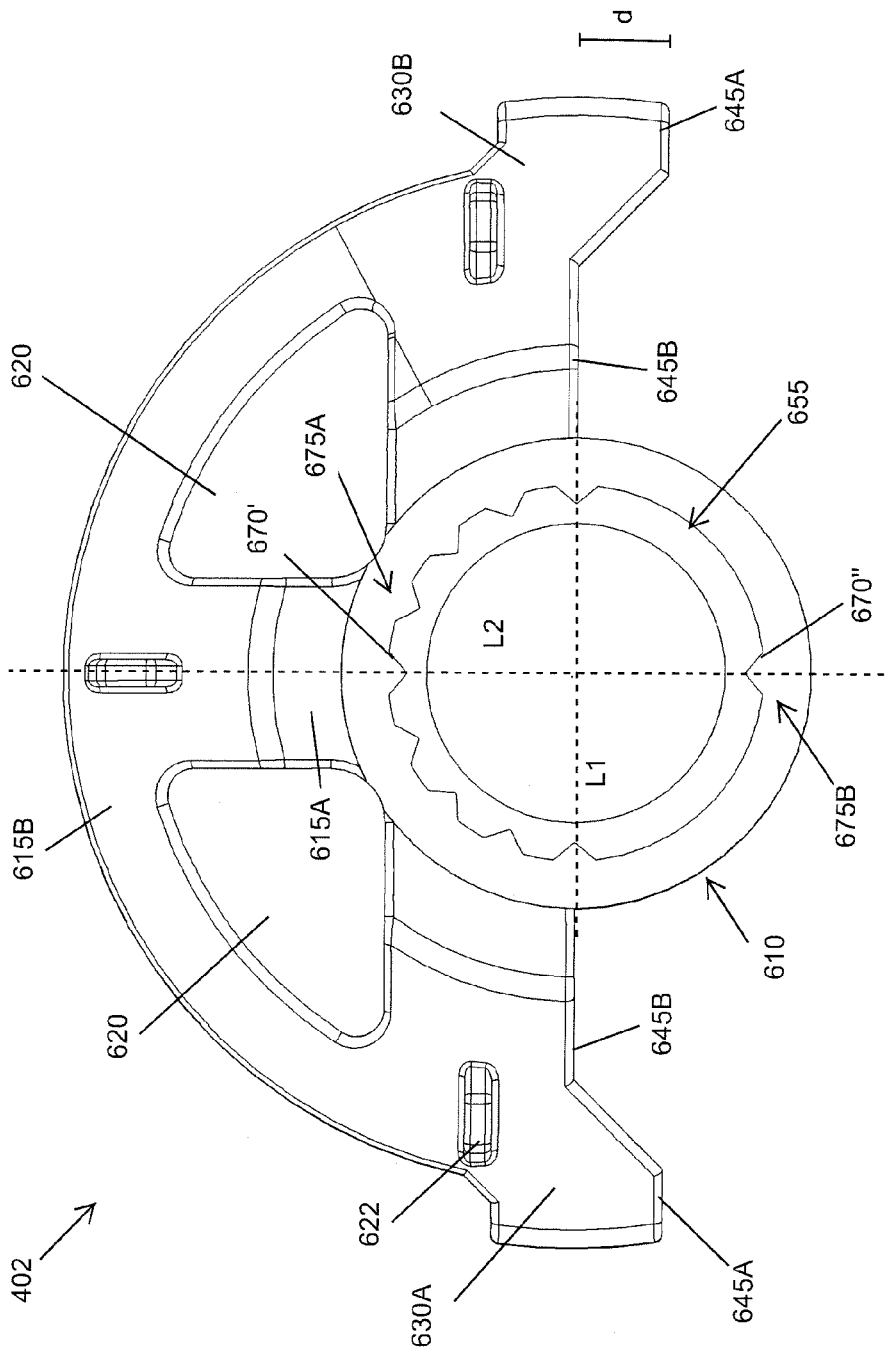

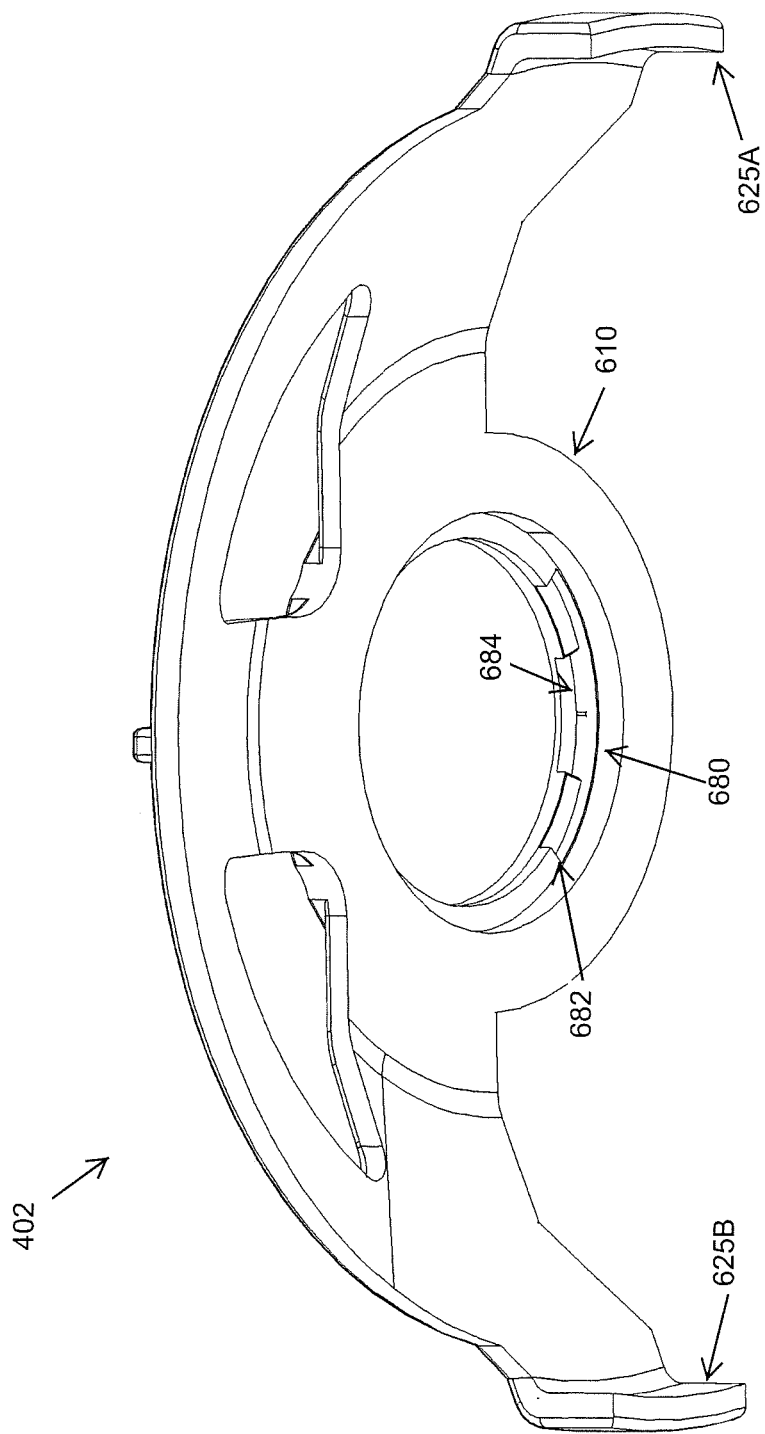

SHIELD ASSEMBLY FOR A POWER TOOL

CROSS REFERENCE TO RELATED APPLICATIONS

The present application claims priority to U.S. Provisional Application No. 61/503,115, filed on 30 Jun. 2011 and entitled "Accessible Guard Lock," the disclosure of which is hereby incorporated by reference in its entirety.

FIELD OF THE INVENTION

The present application is directed toward a shield assembly for a power tool and, in particular, a shield assembly for an angle grinder that is selectively repositionable with respect to the grinding tool.

BACKGROUND OF THE INVENTION

Powered hand tool devices such as angle grinders typically include a protective shield to prevent sparks or particulate material from being directed toward the operator, as well as to prevent inadvertent operator contact with the working tool (e.g., the cutting/grinding blade). Conventional protective guards are solid covers configured to cover a portion of the tool (e.g., a grinding wheel) without interfering with its operation. These guards are rotationally fixed, i.e., they remain at a fixed position with respect to the working tool. Such guards limit the approach angle of the tool, thereby obstructing the operator's line-of-sight or forcing the operator to position her body across the tool (e.g., the grinding wheel). Other guards, while repositionable, require the use of a tool (wrench, screwdriver, etc.) to loosen fasteners that secure the guard in position. Moreover, the positions provided by such guards are limited, making it difficult for the operator to properly control debris/sparks under every working condition. Consequently, operators often remove these conventional guards or leave the guard positioned at a convenient, but other than recommended angle, increasing the likelihood of injury.

It would be desirable to provide a shield assembly for a power tool device that is selectively repositionable in various rotational positions with respect to the working tool. It would further be desirable to provide a guard that is releasable via simple contact of the guard against the work surface (e.g., hands free repositioning), thereby avoiding the need for wrenches, screwdrivers, etc. It would also be desirable to provide a guard that enables an operator to view the working tool during operation.

SUMMARY OF THE INVENTION

The present invention is directed toward a shield assembly for a handheld tool device including a dynamic working tool such as a grinding disc. The shield assembly, which is repositionable with respect to the working tool, includes a guard member, a coupling member, and an actuator. A lock mechanism secures the shield assembly in selected rotational positions relative to the working tool. In operation, engaging the actuator against the work surface releases the lock mechanism, permitting an operator to reposition the shield assembly with respect to the working tool. The shield assembly may further include an alignment feature operable to align the relative positions of the actuator and the coupling member, thereby positioning the components in a predetermined relative orientation. With this configuration, the shield assembly is selectively repositionable via a "hands-free" mechanism that permits a user to adjust the position of the shield assembly by simply contacting the shield assembly against a work surface.

The shield assembly may further be adapted to enable the operator to view the working tool through the guard member during operation. In an embodiment, the guard member is provided with a series of apertures that enable viewing the working tool through the guard member.

BRIEF DESCRIPTION OF THE DRAWINGS

FIG. 6B illustrates a top view in plan of the actuator shown in FIG. 6A.

FIG. 6C illustrates a bottom perspective view of the actuator shown in FIG. 6A.

Like reference numerals have been used to identify like elements throughout this disclosure.

DETAILED DESCRIPTION OF THE INVENTION

Figure 1:
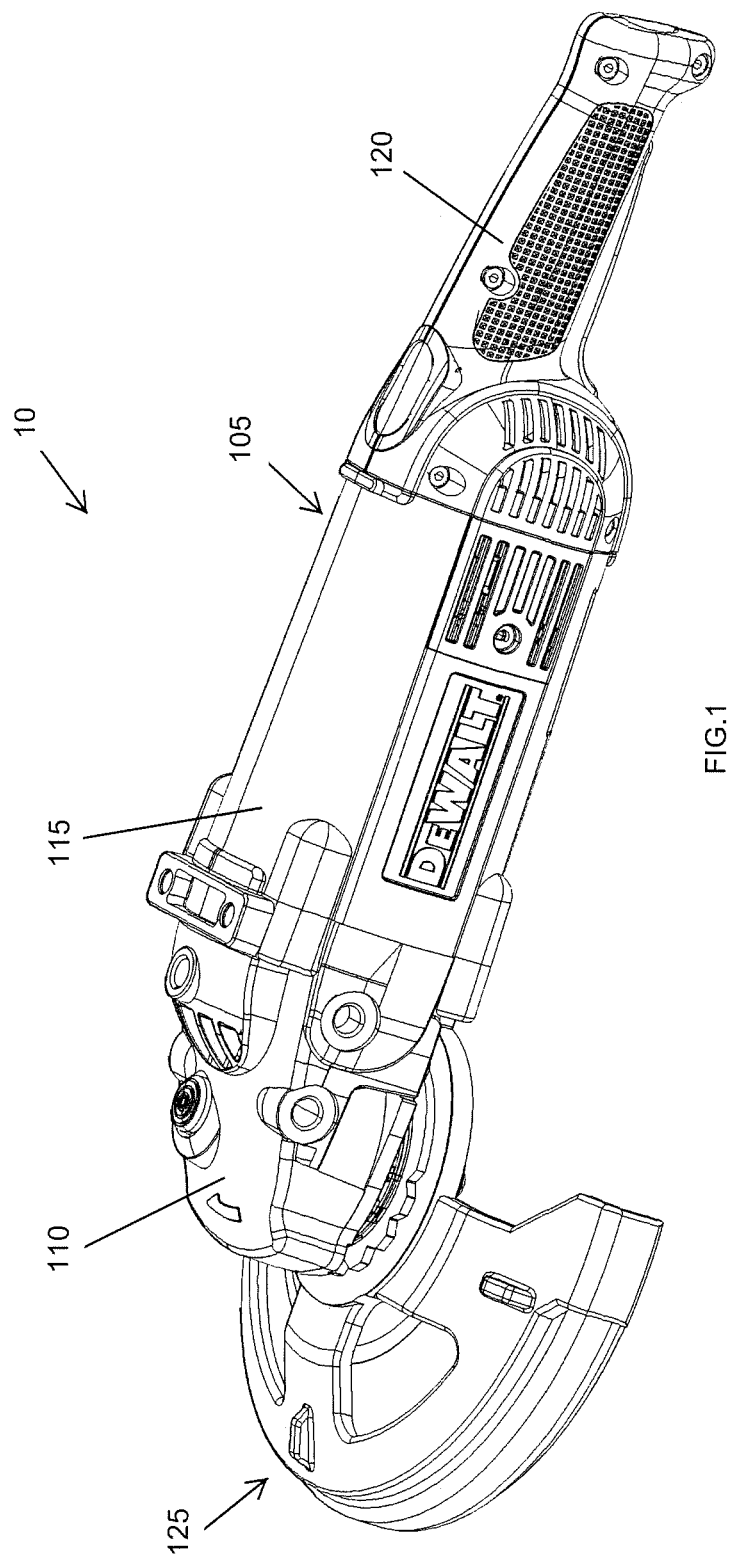
FIG. 1 illustrates a side perspective view of a handheld power tool including a shield assembly in accordance with an embodiment of the invention.

FIG. 1 illustrates a handheld tool device including a shield assembly in accordance with an embodiment of the invention. In an embodiment, the handheld tool device is a powered device with a dynamic working tool, e.g., an angle grinder including a grinding disc. As shown, the handheld tool device 10 includes a housing 105 with a forward gear case 110, a field case 115 housing a motor or armature assembly oriented rearward of the gear case, and a handle assembly 120 oriented rearward of the field case. A shield or hood assembly 125, coupled to the gear case 110 of the device 10, is configured to shield the operator from debris (sparks/particles) generated during device operation.

Figure 2A:
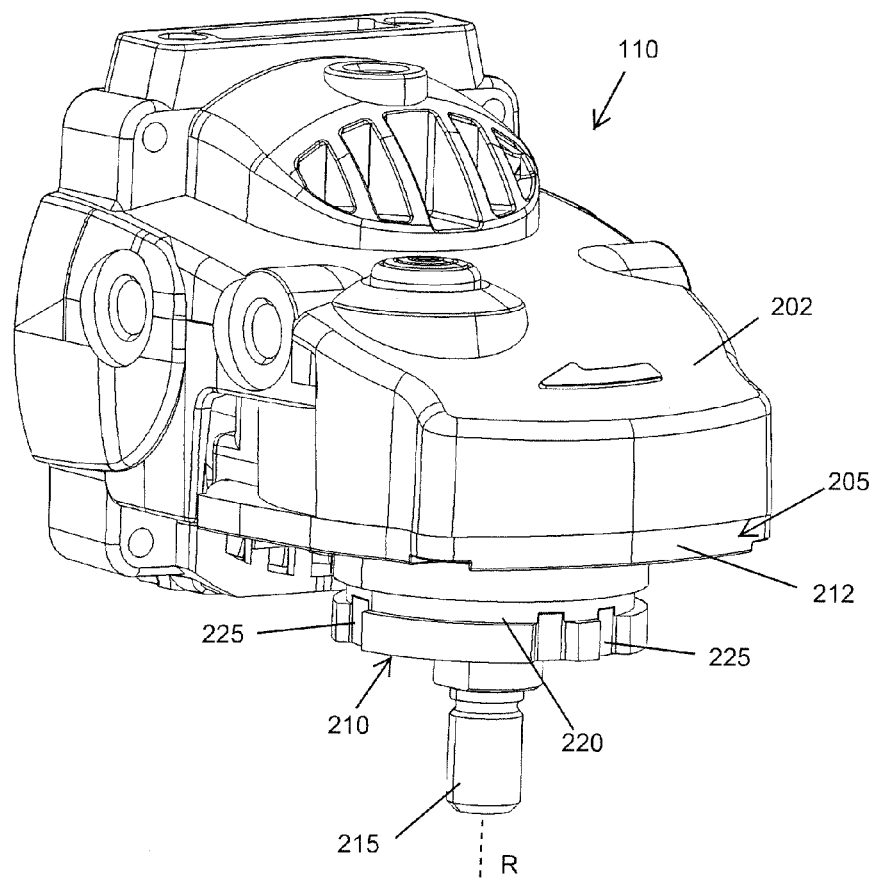
FIG. 2A illustrates a perspective view of a gear case of the power tool shown in FIG. 1, with the shield assembly removed for clarity.
Figure 2B:
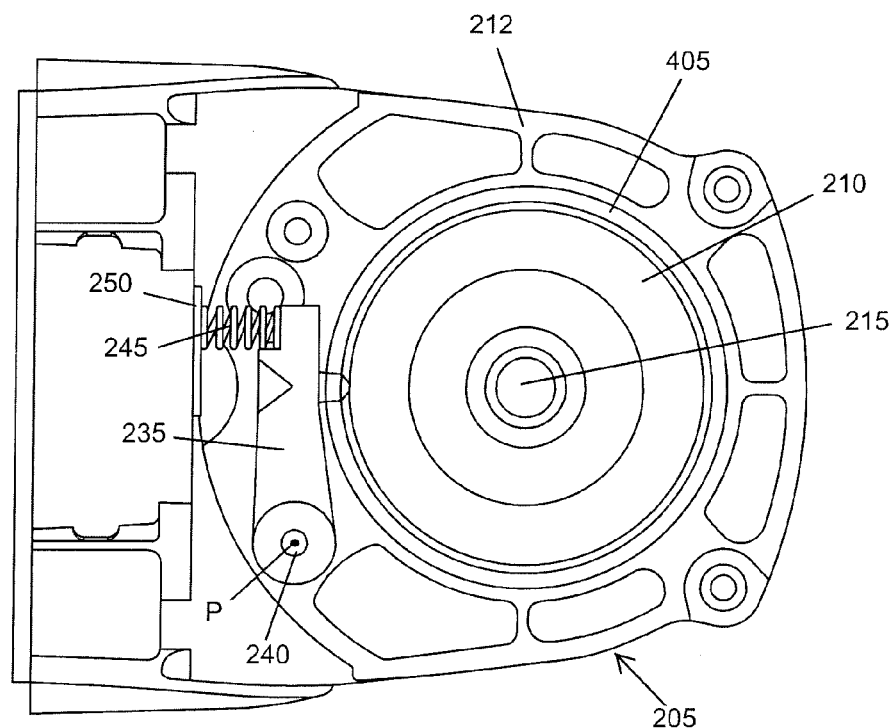
FIG. 2B illustrates a bottom plan view of the gear case cover shown in FIG. 2A.

The gear case 110 houses a gear assembly configured to drive the dynamic working tool such as a grinding disc. Referring to FIGS. 2A and 2B, the gear case 110 of the handheld tool 10 includes an upper cover section 202 and a lower cover section 205. The lower cover section 205 includes a tool collar or neck 210 secured to the upper cover section via a cover flange 212. The neck 210 may define a cylinder having a central channel through which a tool spindle 215 extends. The tool spindle 215, in communication with the armature assembly housed within the field case 115 (via the gear assembly), is rotated by the armature assembly about the spindle rotational axis R. The working tool, e.g., a grinder wheel, is coupled to the tool spindle 215 (seen in FIG. 15B). Consequently, rotation of the spindle 215 causes a corresponding rotation in the working tool. An exemplary handheld power tool device 10 usable with the shield assembly of the present invention is disclosed in U.S. Patent Application Publication No. 2008/0146126 to Gallagher et al., the disclosure of which is incorporated herein by reference in its entirety.

As noted above, the neck 210 of the lower cover section 205 may be a generally annular cylinder. The neck 210 includes an annular track or groove 220 extending about the neck circumference. The track 220 may be disposed at an intermediate neck location (e.g., the track 220 is generally horizontal, and is positioned centrally along the height of the neck), and slidingly receives guide elements disposed on the coupling member. One or more axial (vertical) notches 225 are spaced at predetermined radial locations along the neck 210. The axial notches 225 are aligned to receive guide elements extending from the interior channel of the coupling member 405 (discussed in greater detail below).

A lock mechanism cooperates with the shield assembly 125 to secure the rotational position of the shield assembly with respect to the neck 210 and, consequently, the working tool. As seen best in FIG. 2B, a lock arm or pawl 235 is pivotally coupled to the flange 212 of the lower cover section 205 (via a fastener 240) such that it pivots about a pivot axis P. As shown, the pawl pivot axis P is generally parallel to the spindle rotation axis R. The pawl 235 is biased into its normal, locked position via a biasing member 245 (e.g., a spring) disposed on a spring seat 250 mounted on the lower cover section 205 of the gear case 110.

Figure 3A:
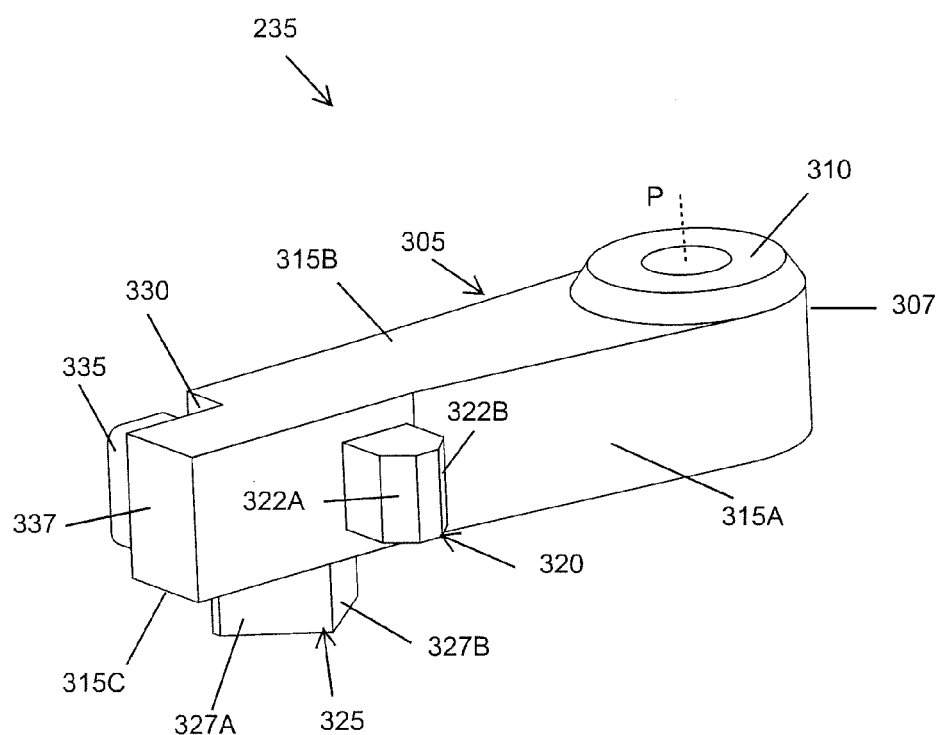
FIGS. 3A and 3B illustrate front perspective views of a pawl device from two angles, in accordance with an embodiment of the invention.
Figure 3B:
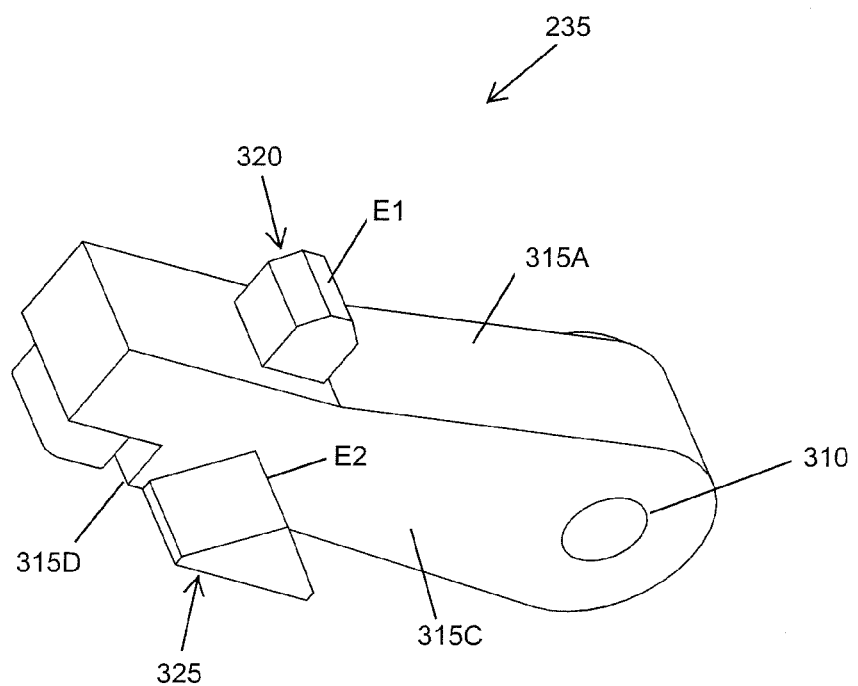

Referring to FIGS. 3A and 3B, the pawl 235 is a lever including an elongated body 305 with a proximal portion 307 including a socket 310 whose axis defines the pivot axis P of the lever. The body 305 includes a forward side 315A, an upper side 315B, a lower side 315C, and a rear side 315D. A first or upper boss 320 (also called a lock or pawl projection) is disposed at an intermediate longitudinal location along the body 305, extending from the body forward side 315A. In addition, a second or lower boss 325 (also called a lock or pawl ramp) extends from the body lower side 315C. The lower boss 325, while aligned longitudinally with the upper boss 320 along the lever body 305, is offset from the upper boss in the body transverse dimension. Accordingly, the upper boss 320 is positioned forward of the lower boss 325 (in the forward pivot direction, i.e., in the pivot direction toward the spindle 215). The upper boss 320 may be a generally rectangular protrusion having a tapered surfaces 322A, 322B defining a generally flat forward edge E1. The lower boss 325 may be generally pyramidal, having ramped surfaces 327A, 327B defining a pointed forward edge E2. It should be understood that the dimensions and shape of any of the pawl and pawl protrusions may by any suitable for their described purposes.

The pawl 235 further includes a cut-out area 330 on rear body side 315D disposed proximate pawl distal end 337. Within the cut-out area 330 is a third or rearward boss 335 (also called a stop member) extends rearward from the rear side 315D of the lever body 305. The third boss 335, which may be generally polygonal, is configured to engage the biasing member 245 extending from the spring stop 250 on the gear case cover 205. The biasing member 245, which is connected to the third boss 335, is configured to drive the pawl 235 forward (toward the spindle 215) such that the pawl (and specifically the first boss 320 and the second boss 325) is biased into engagement with the shield assembly 125 to lock the shield assembly in position (explained in greater detail below).

The shield assembly 125 is configured such that it may be rotatably adjustable about the working tool in a "hands free" manner during operation of the device 10. By "hands free," it is meant that the shield assembly 125 may be repositioned along the neck 210 without the use of auxiliary tools such as wrenches, screwdrivers, etc. Additionally, "hands free" is intended to mean that a user can manipulate the shield assembly 125 safely while the tool device 10 is in operation without engaging the assembly with the user's hands. It should be further understood that "hands free" does not exclude manual manipulation by hand while the tool device 10 is turned off (e.g., engaging the actuator by hand to reposition the shield assembly 125).

Figure 4:
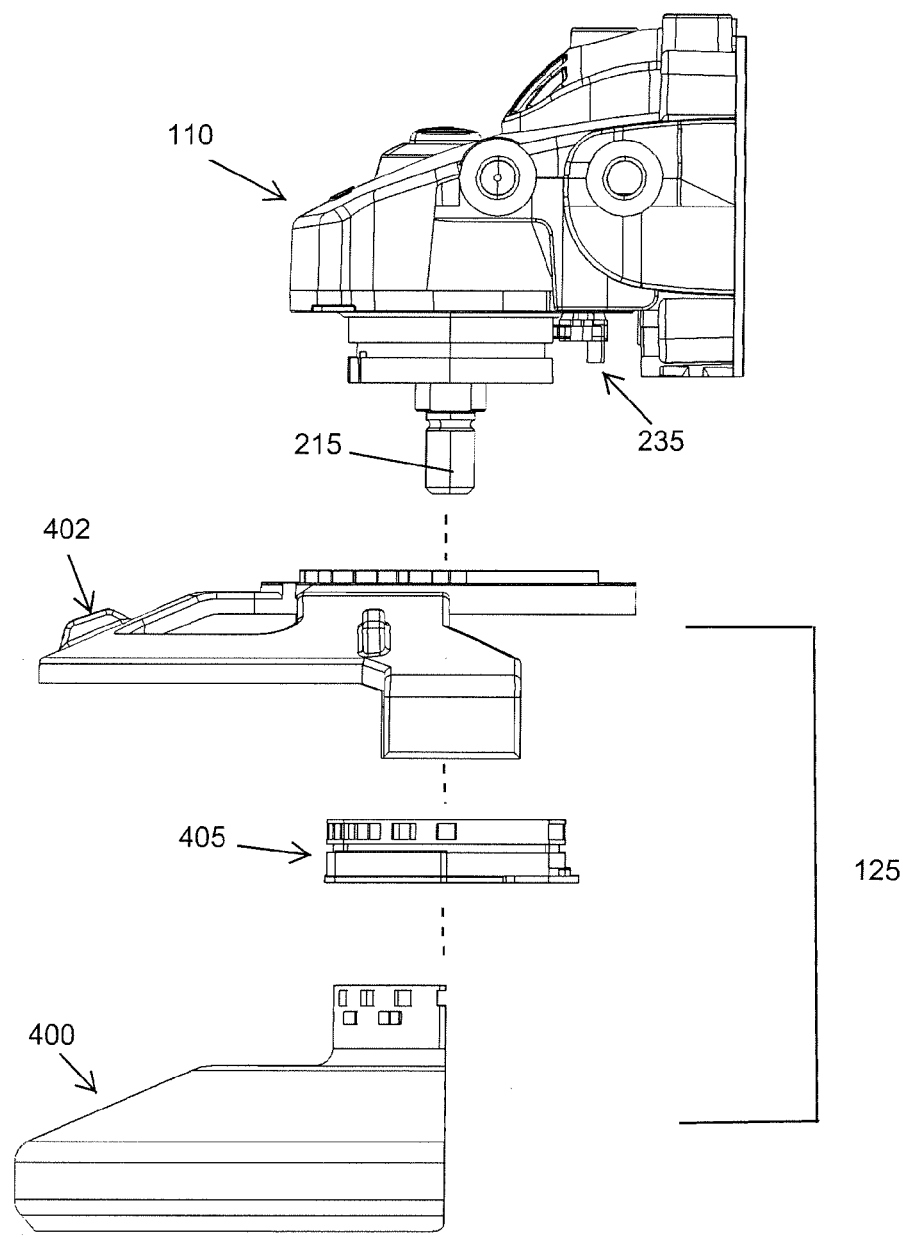
FIG. 4 illustrates an exploded view of the shield assembly and gear case shown in FIG. 1.

Referring to FIG. 4, the shield assembly 125 includes a guard or enclosure member 400, a ratchet actuator or bumper member 402, and a coupling member or collar 405. The guard member 400 at least partially covers the working tool, typically spanning a limited expanse of the working tool. By way of specific example, the guard member 400 extends approximately 180° around the working tool (e.g., a circular disc).

Figure 5A:
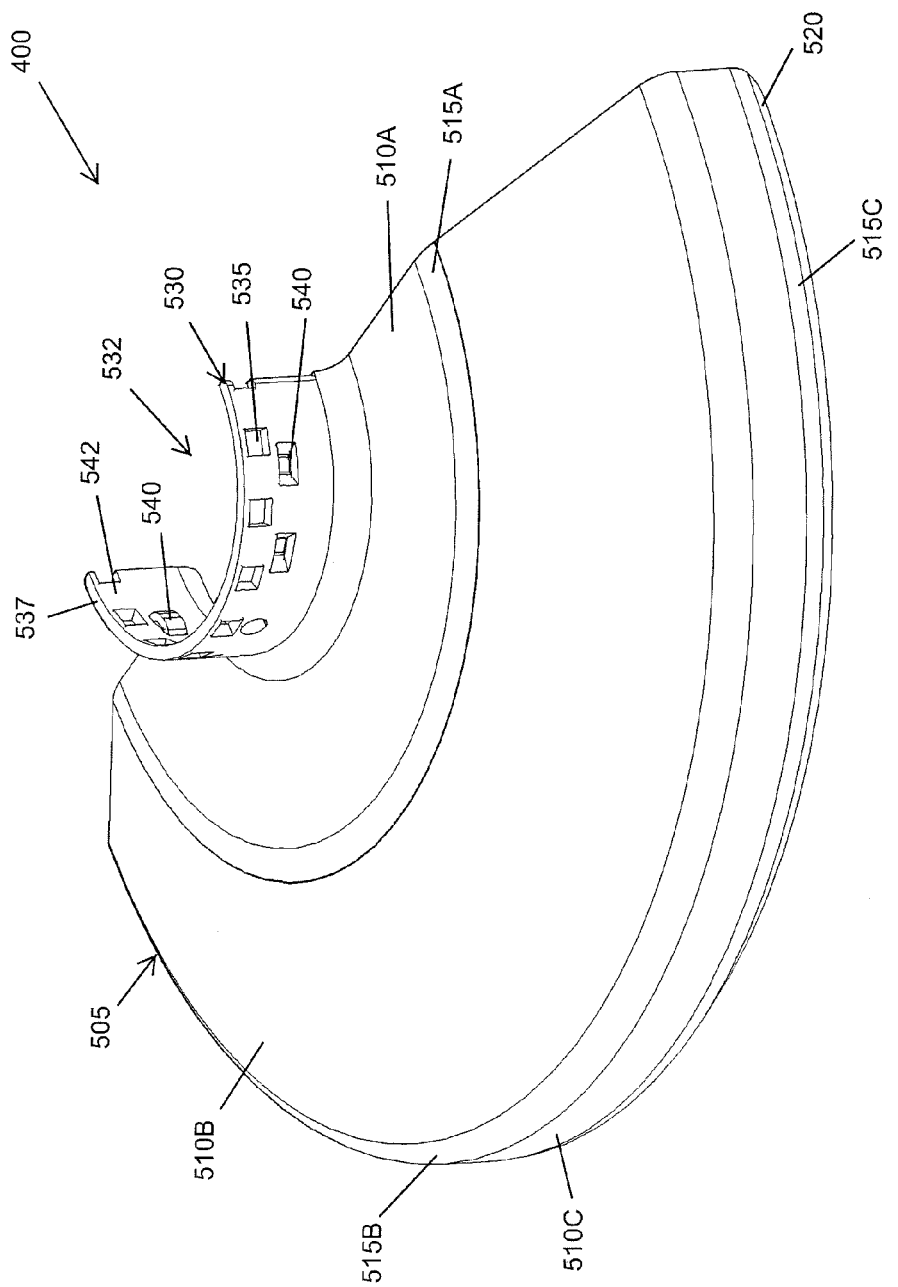
FIG. 5A illustrates a top perspective view of a guard member in accordance with an embodiment of the invention.
Figure 5B:
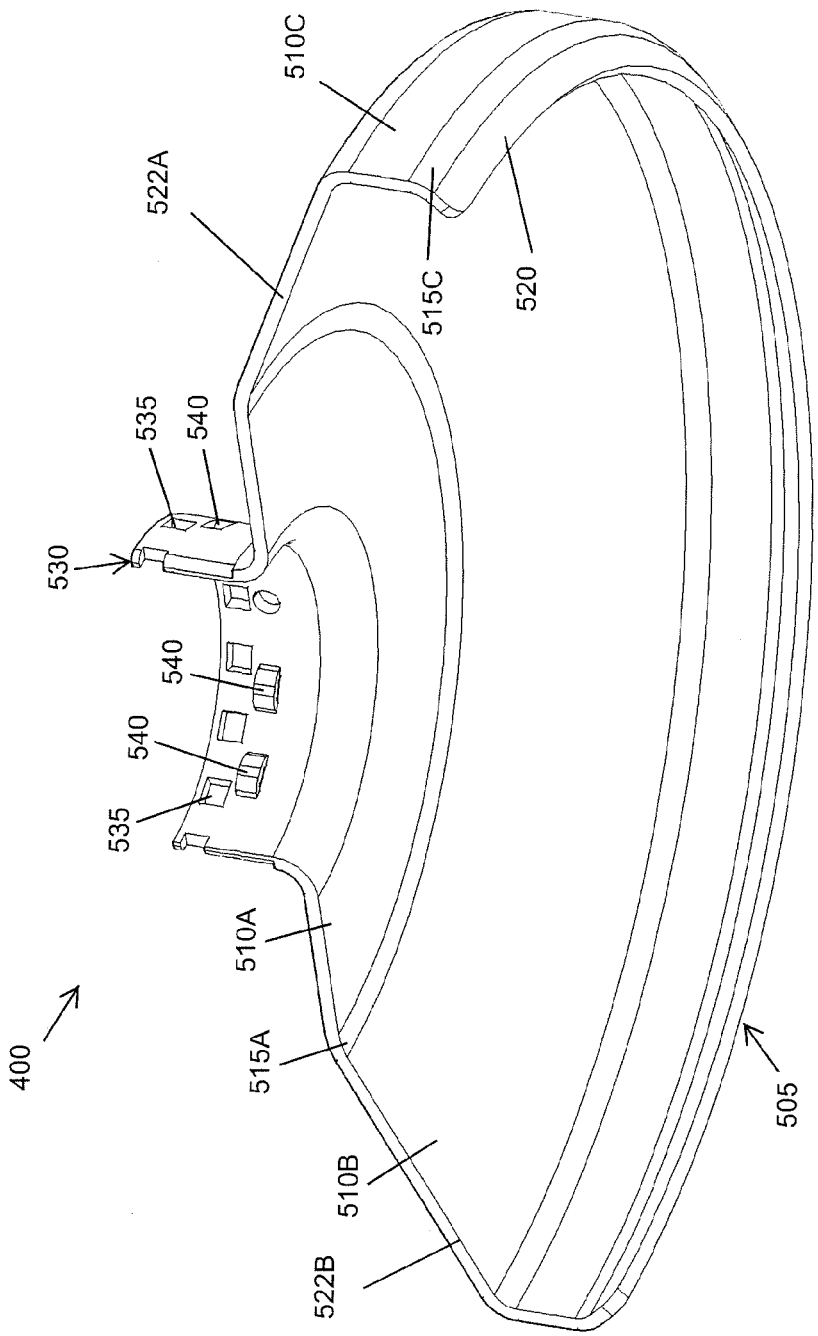
FIG. 5B illustrates a bottom perspective view of the guard member shown in FIG. 5A.

Referring to FIGS. 5A and 5B, the guard member 400 includes a guard body 505 with a base portion 510A, an angled wall portion 510B joined to the base portion along a first or upper beveled area 515A, and a transverse wall portion 510C joined to the angled wall portion along a second or intermediate beveled area 515B. The guard body 505 may further include a lip or rim 520 joined to the transverse wall portion 515C along a third or lower beveled area 515C. The base portion 510 is generally planar, and is oriented generally orthogonal to the spindle axis. The transverse wall portion 510C is oriented generally transverse (e.g., generally orthogonal) to the base portion 510A. As shown, the guard body 505 is generally semicircular, defining a first end 522A and a second end 522B.

A guard flange 530 extends upward from the base portion 510A of the guard body 505, being disposed about the inner perimeter of a body cut-out area 532. The guard flange 530 defines a generally arcuate wall including a plurality of angularly-spaced windows 535 disposed proximate wall upper (distal) edge 537. The guard flange 530 further includes a plurality of radially-extending guide elements or spring tabs 540 angularly spaced at predetermined locations about the flange interior surface 542. The guide elements 540 are sized and positioned to align with the notches 225 formed into the neck 210 on the gear case cover 205, as well as to be received by and ride along the track 220 formed into the neck 210.

Figure 6A:
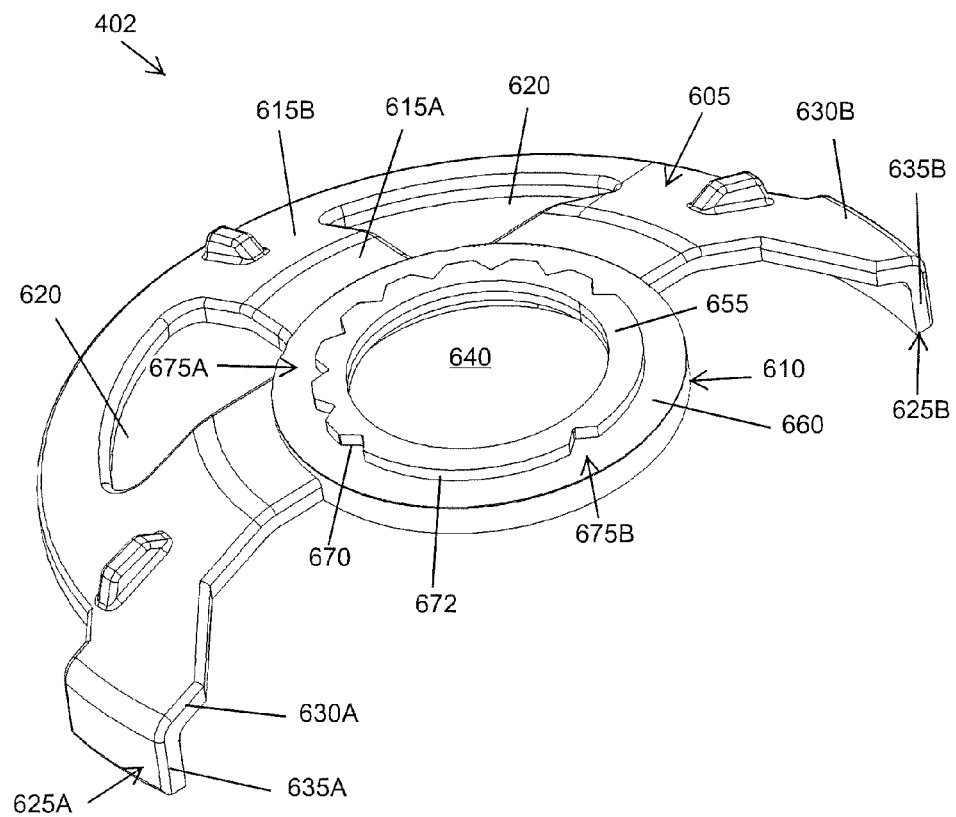
FIG. 6A illustrates a top perspective view of an actuator in accordance with an embodiment of the invention.

The actuator 402 is configured to selectively disengage the lock mechanism when the actuator is moved relative to the guard member 400 and/or the coupling member 405. Referring to FIGS. 6A and 6B, the actuator 402 includes a body 605 and a collar 610. The body 605, generally contoured to the body 505 of the guard member 400, includes a base portion 615A and an angled or ramped portion 615B. The actuator body 605 further includes one or more apertures 620 formed into the body and one or more rib elements 622 disposed at predetermined locations along the body and extending from body upper surface. Rib elements 622 may also be contacted to urge the actuator.

The actuator 402 may further include protruding elements or engagement fingers depending from the actuator body 605 (also called peripheral extensions). In the embodiment illustrated, the actuator 402 includes a first finger 625A and a second finger 625B angularly spaced along the actuator body 605. For example, the first finger 625A may be diametrically opposed from the second finger 625B (i.e., the fingers may be approximately 180° apart) such that each fingers is proximate guard body end 522A, 522B. Each finger 625A, 625B extends downward (axially) from the angled wall section 615B of the actuator body 605. Each finger 625A, 625B may be generally L-shaped, including a radially-extending arm portion 630A, 630B and an axially-extending projection portion 635A, 635B.

Figure 10A:
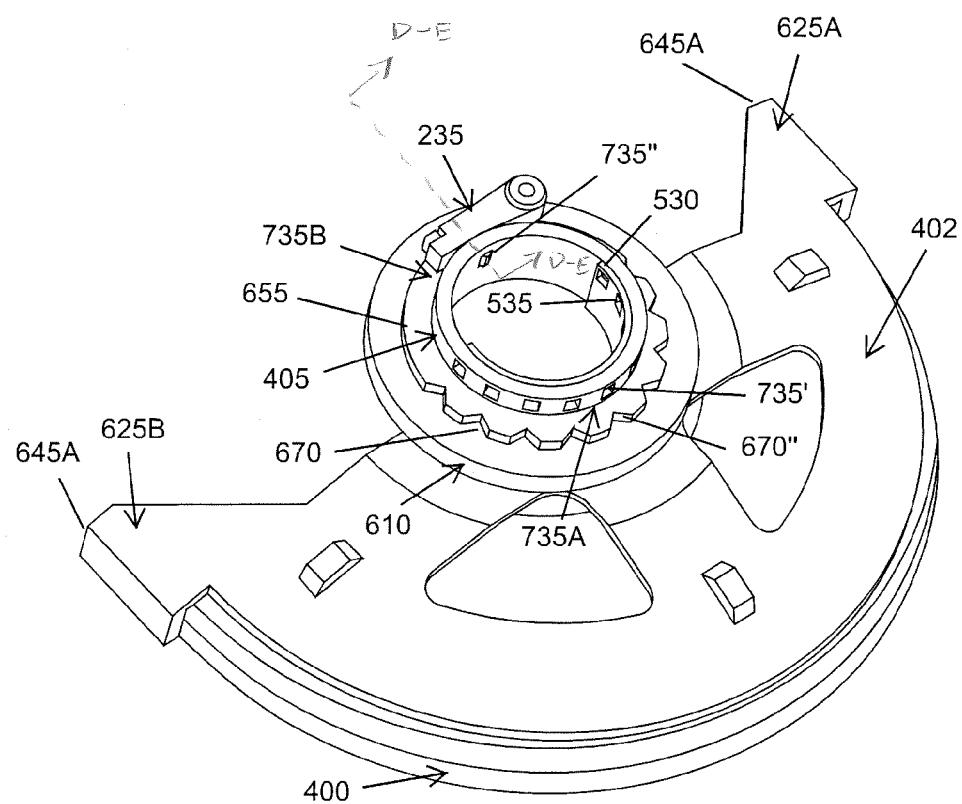
FIGS. 10A-10E illustrate perspective and cross-sectional views of the shield assembly shown in FIG. 1, showing the operation of the shield assembly.
Figure 10B:
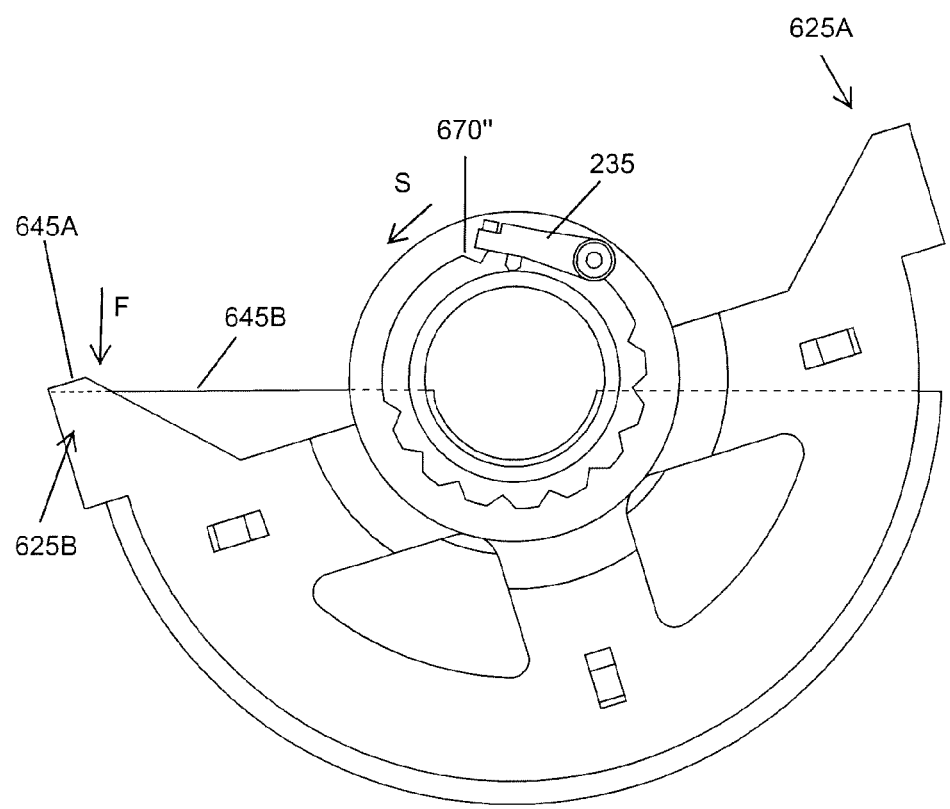

The fingers 625A, 625B extend radially outward from the actuator body 605 such that the rear edge 645A of each finger 625A, 625B is offset from the rear edge 645B of the body 605 by offset distance d. Stated another way, the fingers 625A, 625B are configured to extend beyond the perimeter/periphery of the guard member 400. With this configuration, the fingers 625A, 625B define contact areas that are engaged to move the actuator 402 relative to the guard member 400. The clearance provided by the fingers 625A, 625B create a predetermined travel distance (distance d) the actuator 402 travels before it becomes flush with the body 505 of the guard member 400 (offset seen best in FIGS. 10B and 10C).

The actuator collar 610 is generally annular, defining an opening 640 that receives the neck 210 of the gear case cover 205. A generally annular collar flange 655 is disposed on the actuator collar 610, extending from collar top surface 660. The collar flange 655 is generally coaxial with the ratchet collar 610, possessing an inner diameter that is coextensive with the ratchet collar and an outer diameter that is smaller than the outer diameter of the collar. The collar flange 655 includes a plurality of engagement notches or members 670 angularly spaced about the flange, each engagement notch being configured to receive the lower boss 325 of the pawl 235. By way of example, each engagement notch 670 is generally V-shaped, extending radially inward from the outer circumference 672 of the flange 655 and defined by a first ramped or angled surface and a second ramped or angled surface.

In an embodiment, the collar flange 655 has a first or forward set 675A of engagement notches and a second or rearward set 675B of engagement notches. The first notch set 675A includes a plurality of V-shaped engagement notches 670 angularly spaced along the forward portion of the collar flange 655. The second notch set 675B of includes a single V-shaped engagement notch 670 disposed along the rearward portion of the flange. By way of specific example and as shown in FIG. 6B, the first notch set 675A includes a plurality of notches positioned forward of a first line L1 that bisects the actuator collar 610 in a first direction. The forward set 675A includes a first forward notch 670' generally aligned with a second line L2 bisecting the actuator collar 610 in a second direction that is generally orthogonal to the first line direction. The remaining notches of the forward set 675A extending approximately 45° on either side of the first forward notch 670' (and, as such, the second line L2). The rearward notch set 675B, in contrast, includes a single notch 670'', the single notch being diametrically opposed to the first forward notch 670' of the forward notch set 670A (i.e., the single rearward notch 670'' is also generally aligned with second line L2). It should be understood that each notch set 670A, 670B may include any number of notches suitable for its described purpose. The dimensions and shape of the notches, moreover, may be any suitable for their described purpose.

Figure 6D:
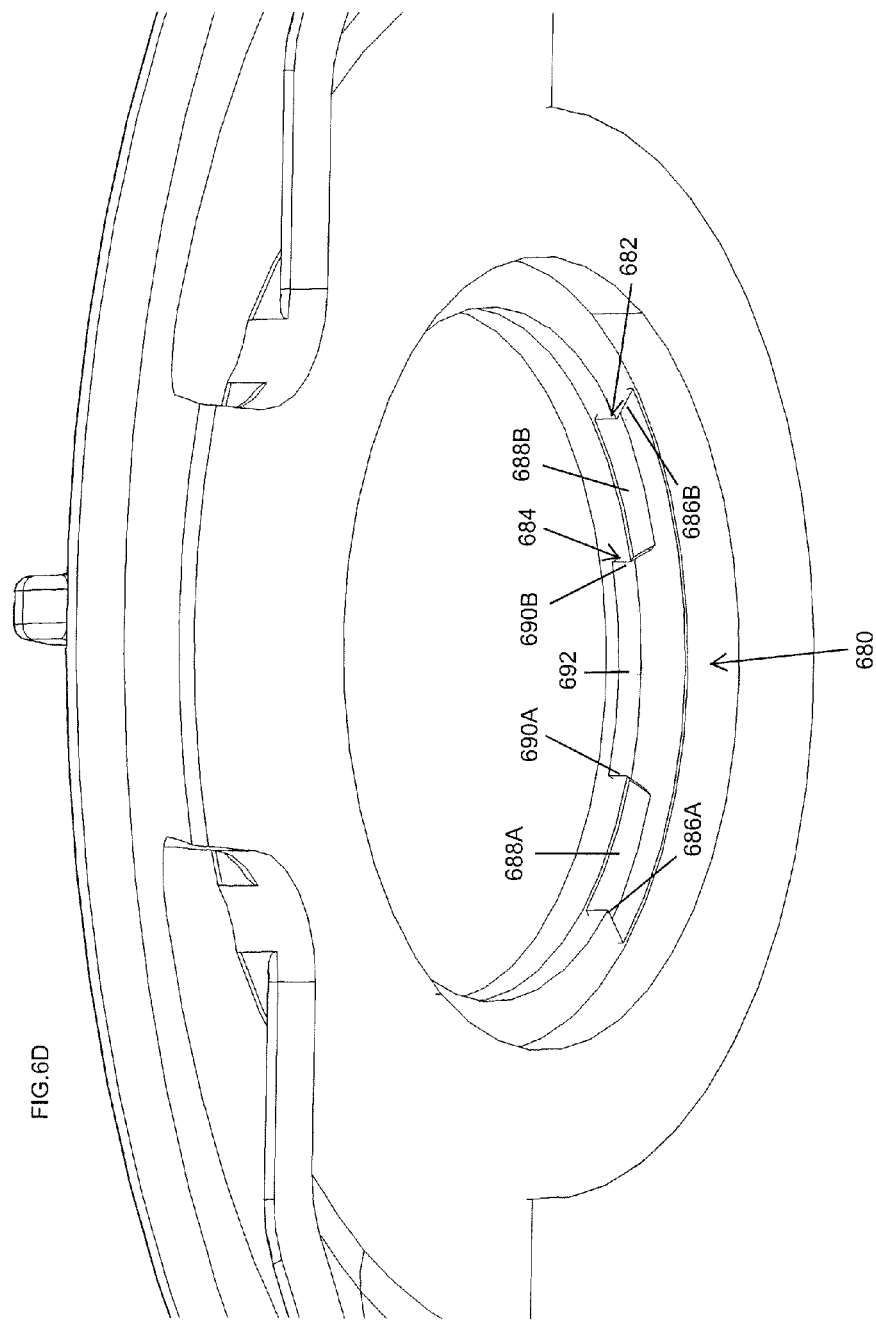
FIG. 6D illustrates a close-up view of the collar portion of the actuator shown in FIG. 6A.

The actuator 402 further includes a female connector portion configured to mate with a male connector portion on the coupling member 405. Referring to FIGS. 6C and 6D, the interior surface of the actuator channel 640 includes a cavity 680 defined by a first or lower recess 682 formed into the actuator collar 610 and a second or upper recess 684 formed into the collar flange 655. As illustrated, lower recess 682 includes dimensions greater than those of the upper recess 684, with the lower recess being wider than the upper recess. The lower recess 682 is defined by a first lateral side 686A, a second lateral side 686B, a first shoulder portion 688A, and a second shoulder portion 688B. Similarly, the second recess 684 includes a first lateral side 690A, a second lateral side 690B, and a shoulder portion 692. With this configuration, the cavity 680 is configured to receive tab elements on the coupling member, permitting limited rotational movement of the coupling member within the actuator channel 640 (discussed in greater detail below).

Figure 7A:
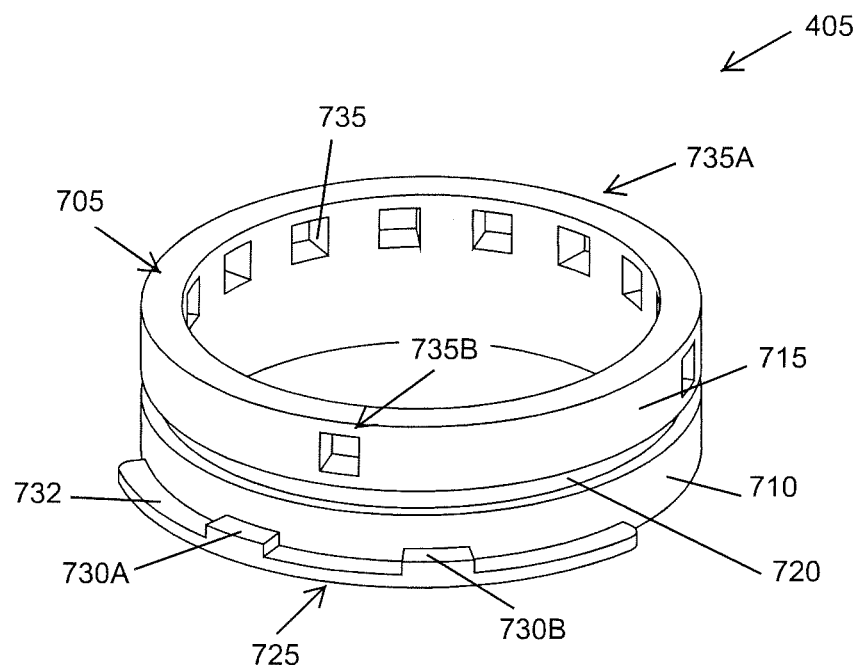
FIG. 7A illustrates a top perspective view of a coupling member in accordance with an embodiment of the invention.
Figure 7B:
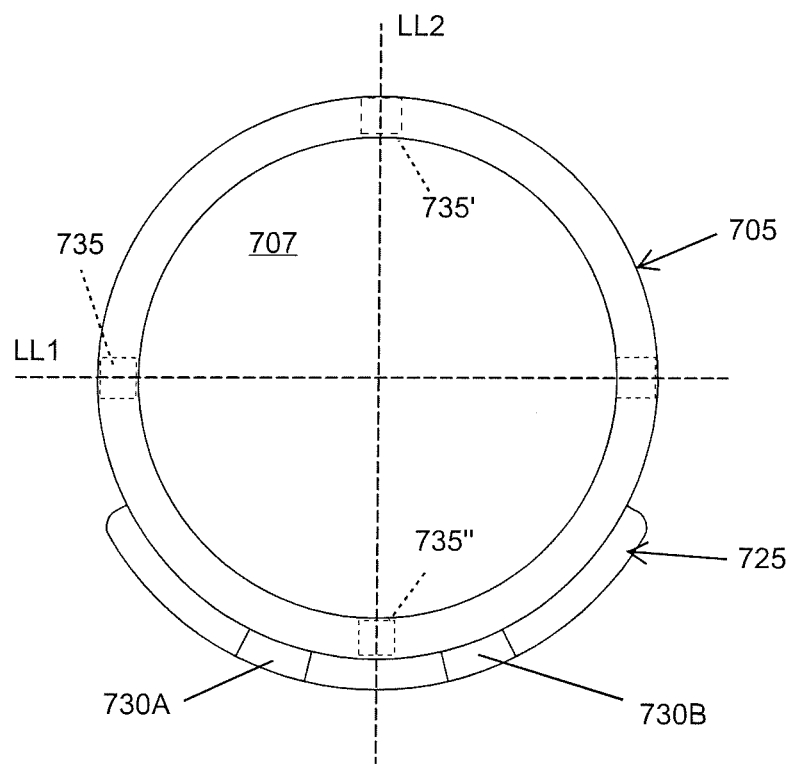
FIG. 7B illustrates a top plan view of the coupling member shown in FIG. 7A.

The coupling member 405 couples the guard member 400 and the actuator 402 to the neck 210. Referring to FIGS. 7A and 7B, the coupling member 405 includes a generally annular body 705 defining a central opening 707 and having a lower portion 710, an upper portion 715, and a channel or race 720 extending along the circumference of the body and oriented between the upper and lower portions. As noted above, the coupling member 405 includes a male connector portion that is received by the female connection on the actuator 402. Specifically, the lower body portion 710 includes a radially-extending platform or shelf 725 disposed within the rear semicircle of the body 705 (i.e., behind a first line LL1 bisecting the coupling member in a first direction, as shown in FIG. 7B). The platform 725 may extend approximately 45° about the perimeter of the body 705. The platform 725 includes a first boss or tab 730A disposed in spaced relation from a second boss or tab 730B. By way of example, the tabs protrude upward from platform upper surface 732, with each tab 730A, 730B being positioned generally equidistantly from a second line LL2 bisecting the coupling member in a second direction generally orthogonal to the first direction.

The upper body portion 715 includes one or more windows 735 configured to receive the upper boss 320 of the pawl 235 coupled to the flange 212 of the gear case cover 205. In an embodiment, the coupling member 405 includes a set of forward windows 735A and a set of rearward windows 735B. The forward window set 735A includes a plurality of windows 735 angularly spaced along the forward section of the coupling member body 705 (i.e., generally within the forward semicircle defined by line LL1). The rearward window set 735B includes a single window 735 centrally disposed along the rearward section of the coupling member body 705 (i.e., within the rearward semicircle defined by the first line LL1). The first forward window 735' of the forward window set 735A may be aligned with the single rear window 735" of the rear window set 735B along the second line LL2. It should be understood that each window set 735A, 735B may include any number of windows suitable for its described purpose. The dimensions and shape of the windows, moreover, may be any suitable for their described purpose.

Each window 735 of the forward window set 735A generally aligns with a corresponding window 535 on the guard flange 530 of the guard member 405 (the position of the guard member is generally fixed with respect to the coupling member, with the coupling member and the moving in concert). Consequently, when the windows 535, 735 are aligned, the upper boss 320 of the pawl 235 passes through each of the guard member 400 and the coupling member 405. Furthermore, upper boss 320 extending into window 735B is the position in which the assembly 125 can be removed from the grinder neck 210.

In addition, the window sets 735A, 735B of the coupling member 405 align with the forward 670A and rearward 670B notch sets of the collar flange 655. That is, each window 735 of the coupling member 405 aligns with a corresponding engagement notch 670 on the flange 655 of the actuator 402. With this configuration, the pawl 235 is able to simultaneously engage a notch 670 (via the lower boss 325) and a window 535, 735 (via the upper boss 320) when the coupling member 405 and the actuator 402 are oriented in their normal positions such that the notches and the windows are in alignment.

As noted above, the coupling member 405 couples to the actuator 402. To connect the coupling member 405 to the actuator 402, the body 705 of the coupling member 405 is inserted into the actuator channel 640 such that the platform 725 and tab elements 730A, 730B are positioned within the lower recess 682 of the collar cavity 680, with the first tab element 730A engaging the first shoulder 688A of the lower recess 682 and the second tab element 730B engaging the second shoulder 688B of the lower recess 682 (i.e., the tab elements are positioned on opposite sides of the upper notch 684 when the coupling member 405 is in its normal position). With this configuration, the actuator 402 may rotate relative to the coupling member 405 (and vice versa), the rotation being limited by stops created by the tabs engaging the sides 685A, 686B of the lower recess 682.

Figure 8A:
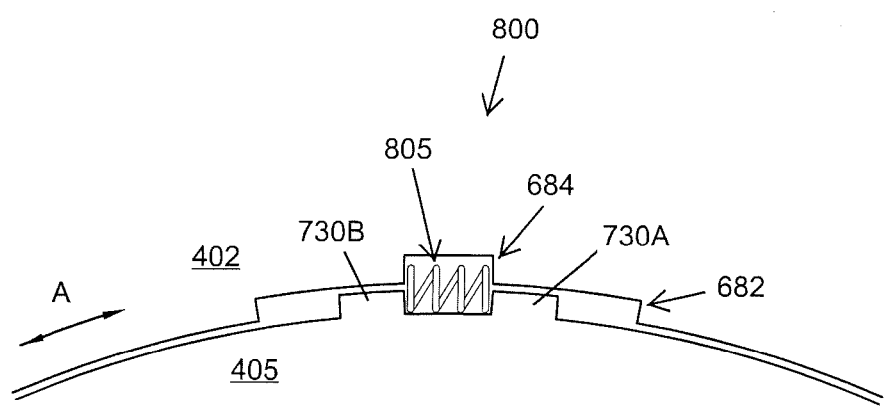
FIGS. 8A and 8B illustrate a schematic of an alignment system in accordance with an embodiment of the invention.
Figure 8B:
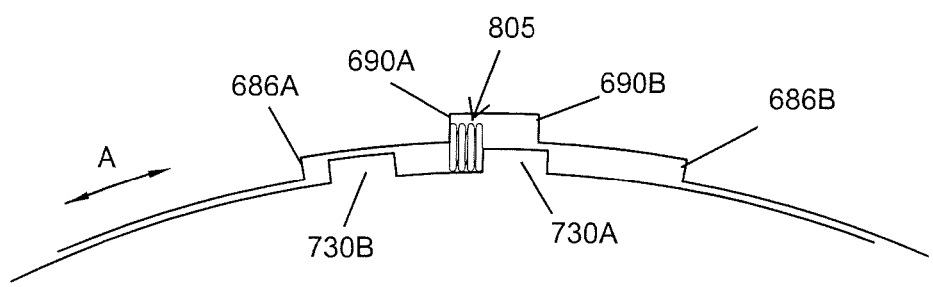

The shield assembly 125 further includes an alignment system operable to orient the actuator 402 into a predetermined, normal position relative to coupling member 405 thereby consistently aligning the notches 670 of the actuator with the windows 735 of the coupling member. In the embodiment shown in FIG. 8A, the alignment feature 800 includes a biasing member 805 disposed within the cavity 680 of the actuator 402. The biasing member 805, which spans the first 682 and second 684 recesses, is positioned between the first tab element 730A and second tab element 730B of the coupling member 405. With this configuration, the biasing member 805 cooperates with the tab elements 730A, 730B to particularly align the coupling member 405 with respect to the ratchet actuator 402, orienting the components in a normal position relative to each other. Specifically, when the actuator 402 is in its normal position, the biasing member 805 (e.g., a spring such as a coil spring) is in its normal, expanded configuration. When the actuator 402 is rotated relative to the coupling member 405 in either direction as indicated by arrow A (e.g., by the user contacting the actuator 402 against a work surface), the biasing member 805 becomes compressed as illustrated in FIG. 8B. Once the applied rotational force is discontinued, however, the biasing member 805 expands, returning the coupling member 405 and the actuator 402 back to their respective normal positions in which the notches 670 and the windows 735 align.

With this configuration, the alignment system drives the actuator 402 back to its normal position such that it is particularly aligned with the coupling member 405. This alignment system ensures that when the biasing member 805 is in its normal, expanded configuration (i.e., when actuator 402 is not being rotated relative to the guard member 400), the actuator 402 has a particular relative orientation with respect to the coupling member 405. When particularly aligned, the windows 735 of the coupling member 405 are aligned with the notches 670 of the actuator flange 655, enabling the pawl 235 to lock the guard member 400 in a desired relative position with respect to the cutting tool (discussed in greater detail below). Should the ratchet actuator 402 be rotated relative to the coupling member 405 by application of a force sufficient to overcome the biasing force of the biasing member 805, the windows and notches will become temporarily misaligned, but will realign upon removal of the outside force.

Figure 9A:
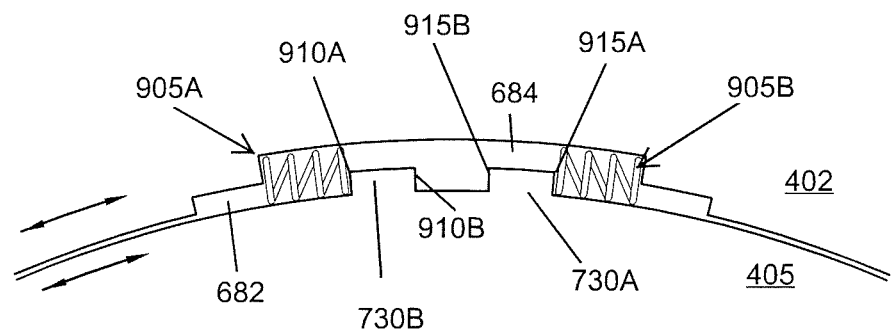
FIG. 9A illustrates a schematic of an alignment system in accordance with an embodiment of the invention.

Another embodiment of the alignment system is illustrated in FIG. 9A. As shown, the first tab element 730A of the coupling member 405 is biased via a first biasing member 905A extending from the first lateral side 690A of the upper recess 684 to a lateral side 910A of the first tab element. Similarly, the second tab element 730B is biased via a second biasing member 905B extending from the second lateral side 690B of the upper recess 684 to a lateral side 915B of the second tab element. With this configuration, the biasing members 905A, 905B cooperate to particularly align the coupling member 405 with respect to the actuator 402, orienting the components in a normal position relative to each other. Specifically, when actuator 402 is rotated relative to the coupling member 405 in either direction (or vice versa, as indicated by arrows), one of the biasing members 905A, 905B is compressed while the other biasing member 905, 905B is extended. Upon removal of the contact/rotational force, the biasing members 905A, 905B drive the components back to their normal relative position.

Figure 9B:
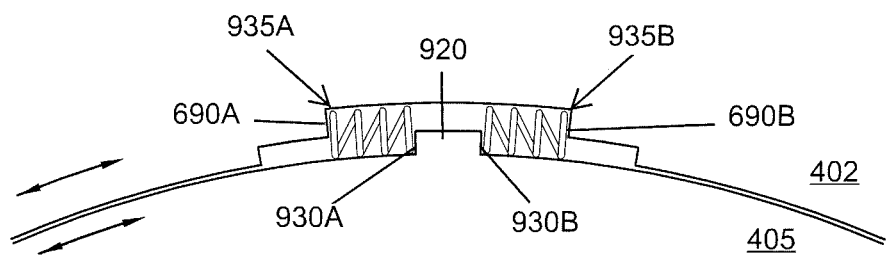
FIG. 9B illustrates a schematic of an alignment system in accordance with an embodiment of the invention.

FIG. 9B illustrates another configuration of the alignment system. As shown, instead of having two tab elements 730A, 730B, the coupling member 405 has a single tab 920, with each lateral side of the single tab element 930A, 930B being coupled to a biasing member 935A, 935B. Again, the biasing members 930A, 930B cooperate to position the actuator 402 in a predetermined rotational position with respect to the coupling member.

Figure 9C:
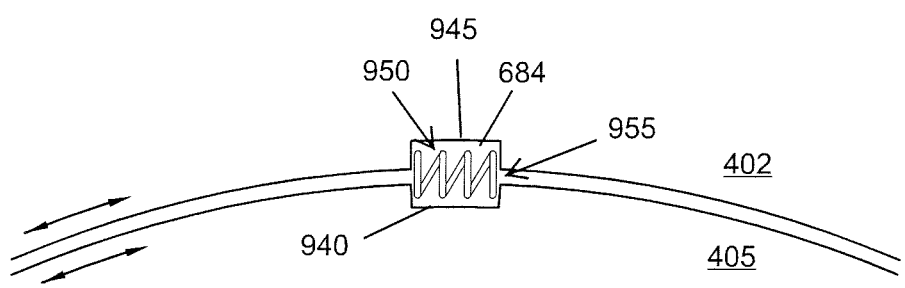
FIG. 9C illustrates a schematic of an alignment system in accordance with an embodiment of the invention.

FIG. 9C illustrates still another embodiment of the alignment system. Here, the coupling member 405 does not include a platform 725 or tab elements 730A, 730B, but instead includes a recess 940 that aligns with a cavity 945 on the actuator 402 having dimensions similar to that of the coupling member recess 940 to define a pocket 950. A single biasing member 950 is disposed within the pocket 955 defined by the recesses 680, 940. The biasing member 950 biases the components in a manner similar to that described above.

With the above described configuration, the actuator 402 is coupled to the coupling member 405 such that the actuator is permitted to rotate about the coupling member to a limited extent. The actuator 402 is further coupled to the guard member 400 (e.g., via snap fit). The guard member 400, in turn, is coupled (e.g., captured) to the neck 210 of the gear case cover 205 via the guard member flange 530. When coupled, the guide elements 540 on the guard member flange 530 are slidably received by the track 220 formed into the neck 210. As a result, the guide elements 540 travel along the track 220, guiding the rotation of the guard member 400 along the neck 210. In addition, the guide elements 540 may also function as biasing members, biasing the guard member 400 radially outward from the spindle 215 to maintain frictionally engagement between the flange 530 of the guard member 400 and the coupling member 405.

The operation of the device is explained with reference to FIGS. 10A-10E. In its normal (initial) position (FIG. 10A), the forward window set 735A of the coupling member 405 is aligned with a corresponding window 535 on the guard flange 530. Additionally, each notch 670 of the forward notch set 675A on the collar flange 655 is generally aligned with the windows 735 of the forward window set 735A. Similarly, the single rearward window 735" on the coupling member 405 is aligned with the single rearward notch 670" on the actuator flange 655. The pawl 235, moreover, is disposed in its normal, locked position. In the pawl locked position, the upper boss 320 passes through the rearward coupling member window 735" and the lower boss 325 engages the rearward actuator notch 670". In this locked configuration, the shield assembly 125 is secured, i.e., the rotational position of the guard member 400, the actuator 402, and the coupling member 405 are fixed via interlocking with pawl 235.

To place the pawl 235 in its unlocked position, the user contacts and urges or bumps the actuator 402 against a surface. Specifically, the user contacts the rear edge 645A of one of the fingers 625A, 625B against a surface (or engages manually, e.g., by pressing with a hand). Once the force applied (indicated by arrow F) is sufficient to overcome the biasing force placed on the pawl 235 by the pawl biasing member 245, as well as the biasing force of the alignment system biasing member 805, the actuator 402 begins to rotate (indicated by arrow S in FIG. 10B). The rotation of the actuator continues 402 may continue until the finger rear edge 645A becomes flush with the rear edge 645B of the guard member body 505. As the actuator 402 rotates, the ramped surfaces of the notch 670 drive the pawl 235 outward, away from the spindle 215. That is, the lower boss 325 is driven away from the coupling member 405 and out of its notch, which, in turn, pivots the pawl 235 outward at a distance sufficient to move the upper boss 320 out of engagement with the rearward coupling member window 735". FIGS. 10 D and E show cross sections of pawl 235 in the locked and unlocked positions respectfully.

Figure 10C:
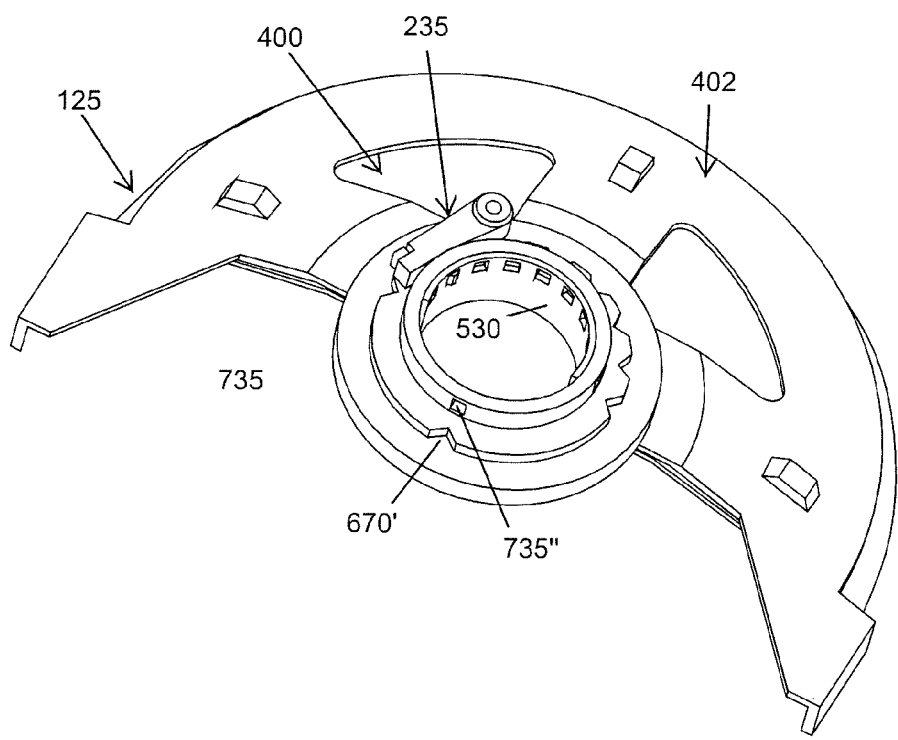
Figure 10E:
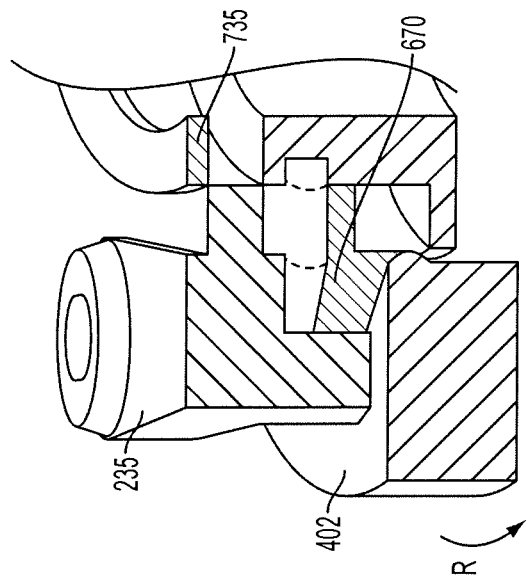
Figure 10D:
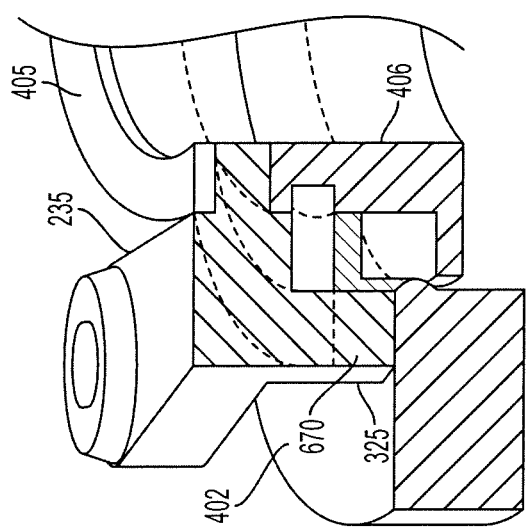

When the upper boss 320 has cleared the rearward coupling member window 735", the shield assembly 125 (the guard member 400, the ratchet actuator 402, and the coupling member 405) may be rotated about the neck 210 of the gear case cover 205 until the desired shield assembly position is reached (FIG. 10C). That is, continuing to contact the shield assembly 125 against the work surface will rotate the shield assembly 125 about the neck 210 to the next window opening 735. Once the desired rotational position is achieved, the lock mechanism may remain in its locked position. That is, the shield assembly 125 may be rotated until the bosses 320, 325 of the pawl 235 are aligned with a desired window 735 and its associated notch 670. Once the lower boss 325 is aligned with the desired notch 670, the operator discontinues contacting the guard member 400 and the actuator 402 against the work surface. As a result, the pawl 235 is driven inward (toward the spindle 215) by the pawl biasing member 245, positioning the lower boss 325 within the desired notch 670 and positioning the upper boss 320 within the associated window 735. The pawl 235 is now in its locked position, securing the rotational position of the shield assembly 125 with respect to the neck 210.

If, for any reason, the windows of the coupling member 405 and the notches 670 on the flange 655 of the actuator 402 become misaligned during rotation of the shield assembly 125, the alignment system 800 will automatically reorient the coupling member 405 and with respect to the actuator 402 (and vice versa) to rotationally align the components. As mentioned above, in order for the pawl 235 to engage the notch 670 and its associated window 735, it is necessary that the notch and window be aligned. Thus, should the notch 670 and window 735 become misaligned, the biasing member 805 will act on the tab elements 730A, 730B as described above to drive the rotational position of the components into their normal, predetermined position, in which the notches 670 and the windows 735 align.

Another embodiment of a hands-free, selectively repositionable shield assembly is illustrated in FIGS. 11A-11D. As shown, the shield assembly 1100 includes a guard member 1105 having a generally semicircular body 1107 defining a first lateral end 1110A and a second lateral end 1110B. The body 1107 of the guard member 1105 includes a neck or flange portion 1115A, a generally planar base portion 1115B and a transverse wall portion 1115C. The shield assembly 1100 further includes a generally annular guard collar 1120 configured to surround the neck 1125 of the gear case cover 1130. The guard collar 1120 includes a generally rectangular window 1135 and a post or tab 1140 extending radially outward from the guard collar, along the window lower edge.

The neck 1125 of the gear case cover 1130 defines a round gear, including a plurality of gear teeth 1145 that cooperates with a pawl on the shield assembly 1100 to provide incremental rotational adjustment of the guard member with respect to the spindle and/or working tool (discussed in greater detail below). In an embodiment, the gear teeth 1145 are sloped in a single direction and are uniformly spaced along the circumference neck 1125. Each gear tooth 1145, moreover, may be asymmetrical, with each tooth having a moderate slope along one edge and a steeper slope on the other edge.

A sliding actuator 1150 is disposed along an end 1110A, 1110B of the guard member 1105. The sliding actuator 1150 defines a generally S-shaped bracket including a proximal short arm section 1152A coupled to the guard member flange portion 1115A, a long arm section 1152B extending radially from the proximal short arm section 1152A, and a distal short arm section 1152C extending axially along the transverse wall portion 1115C. The distal short arm section 1152C includes a tab 1155 extending radially outward therefrom. The long arm section 1152B includes a one or more elongated guide slots 1160A, 1160B that each moves along a corresponding guide post 1162A, 1162B. A biasing member such as a spring 1151 biases the sliding actuator 1150 in a normal position relative to the guard member 1105. With this configuration, the sliding actuator 1150 moves (e.g., translates) along the guard member 1105 from an extended position (illustrated), in which it protrudes beyond the end 1110A, 1110B of the guard member 1105, to a retracted position, in which the outer edge of the actuator 1150 is generally flush with respect to guard body end 1110A, 1110B.

Figure 11A:
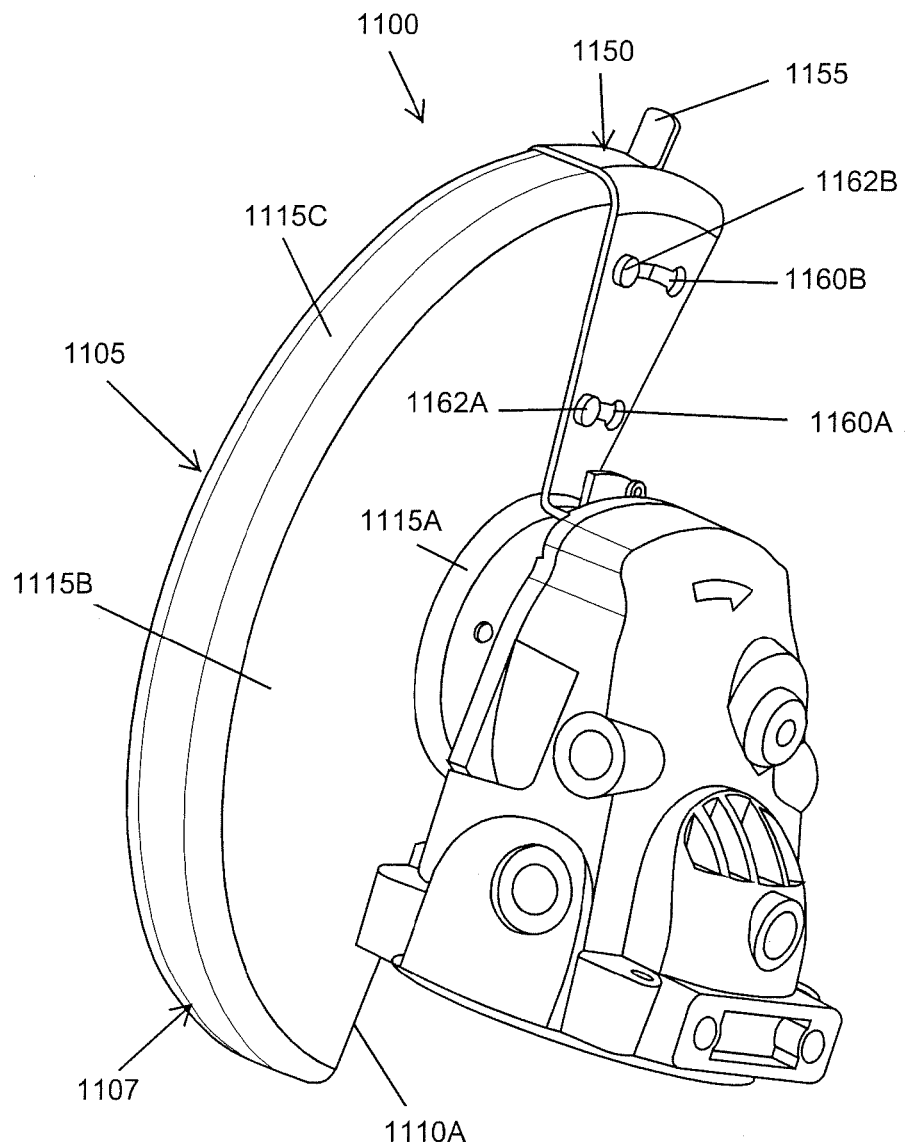
FIGS. 11A-11D illustrate views of a repositionable shield assembly in accordance with another embodiment of the invention.
Figure 11B:
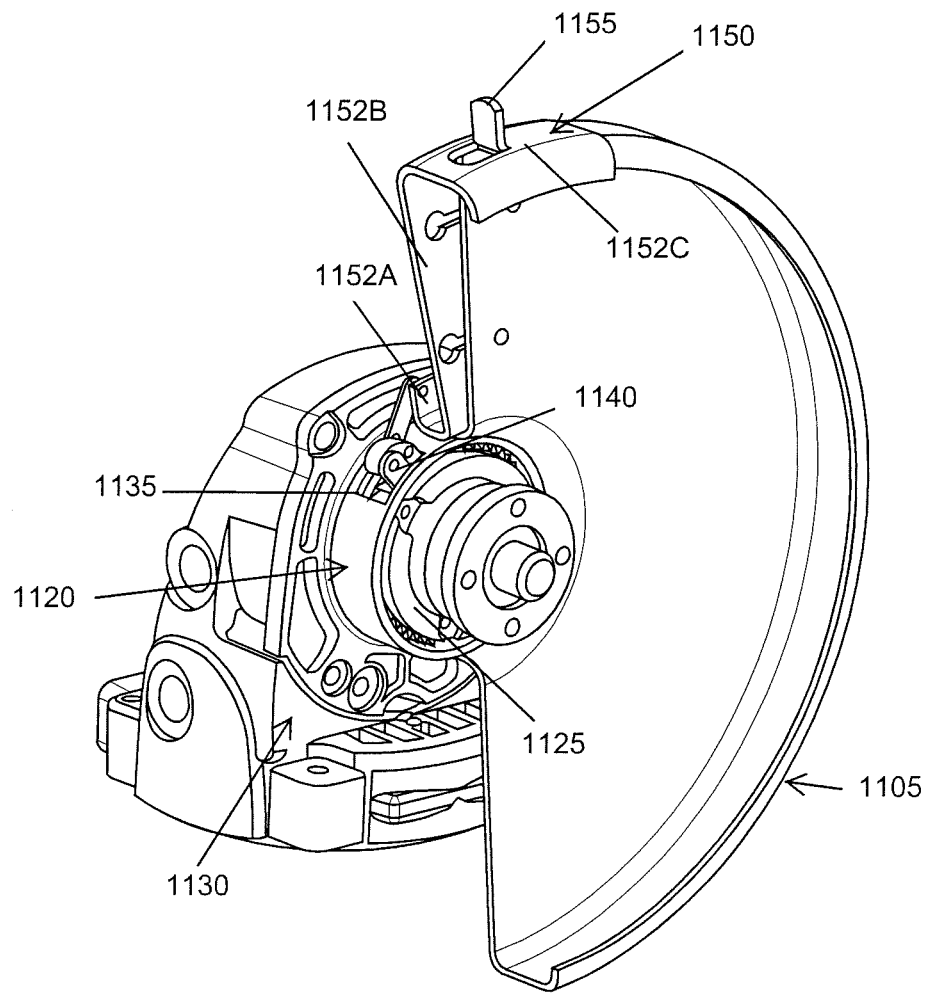
Figure 11C:
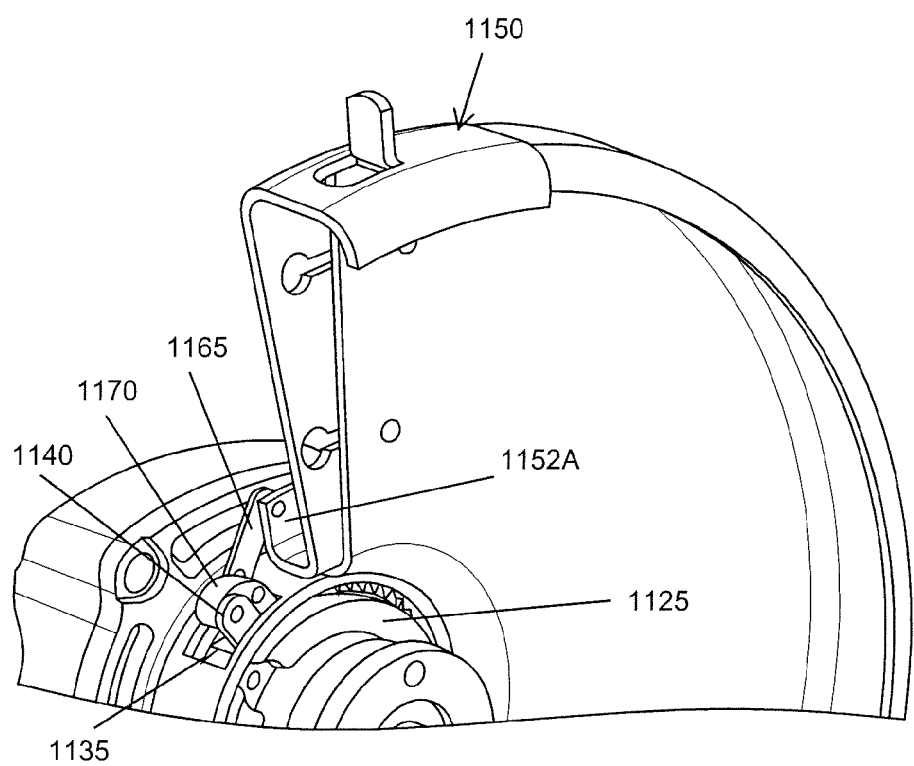
Figure 11D:
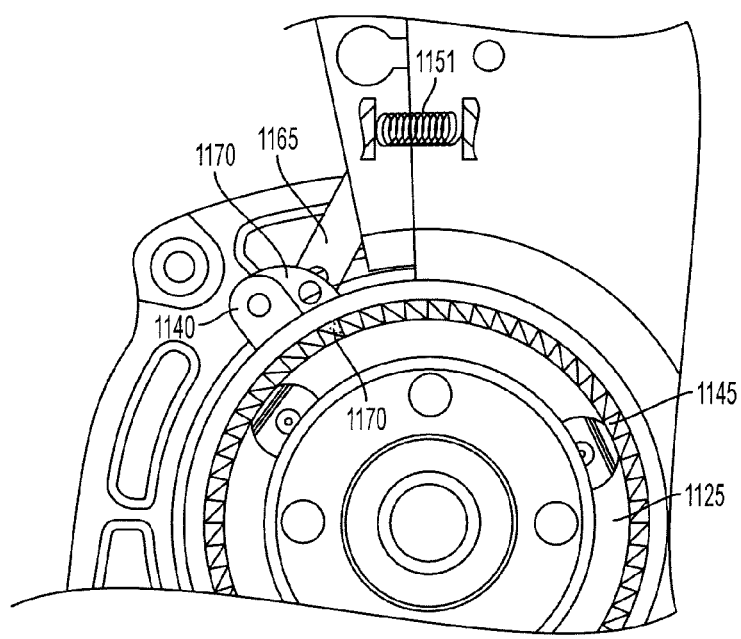

The sliding actuator 1150 is in communication (e.g., is mechanically linked) with a lock mechanism configured to selectively secure the guard member 1105 in a desired rotational position along the collar (and thus with respect to the working tool). Referring to FIGS. 11C and 11D, the lock assembly includes a linkage or rod 1165 pivotally coupled to the proximal section 1152A of the actuator 1150 along the linkage proximal end. In addition, the linkage distal end is pivotally coupled to a pawl 1170, which, in turn, is pivotally coupled to the window tab 1140. The pawl 1170 selectively engages the gear teeth 1145 on the neck 1125 of the gear case 1130 to prevent the rotation of the gear in a predetermined direction (e.g., in a clockwise and/or a counterclockwise direction).

In operation, the shield assembly 1100 begins in its normal, locked position, in which the actuator 1150 is in its extended position, being biased by biasing member. In the locked position, the rotation of the guard member 1105 with respect to the neck 1125 (and thus the working tool) is prevented. To release the shield assembly 1100, the operator contacts the tab 1155 of the actuator 1150 against an object such as the workpiece or work surface. Otherwise, the operator may manually engage the actuator 1150 by grasping the tab 1155. Engaging the actuator 1150 moves the actuator from its extended position to its retracted position. As the actuator 1150 moves, the linkage member 1165 is driven outward, pivoting the pawl 1170 outward, away from the neck 1125. The pawl 1170 disengages the gear teeth 1145 of the neck 1125. In this disengaged position, the shield assembly 1100 may be rotated about the neck 1125 to reposition the guard member 1105 with respect to the working tool. When released, the actuator is driven back to its normal position by biasing member, returning the pawl 1170 into engagement with the gear teeth 1145. With this configuration, the operator may simply contact an edge of the guard member against a stationary object such as a workpiece to incrementally rotate the shield assembly 1100 about the neck 1125.

Figure 12A:
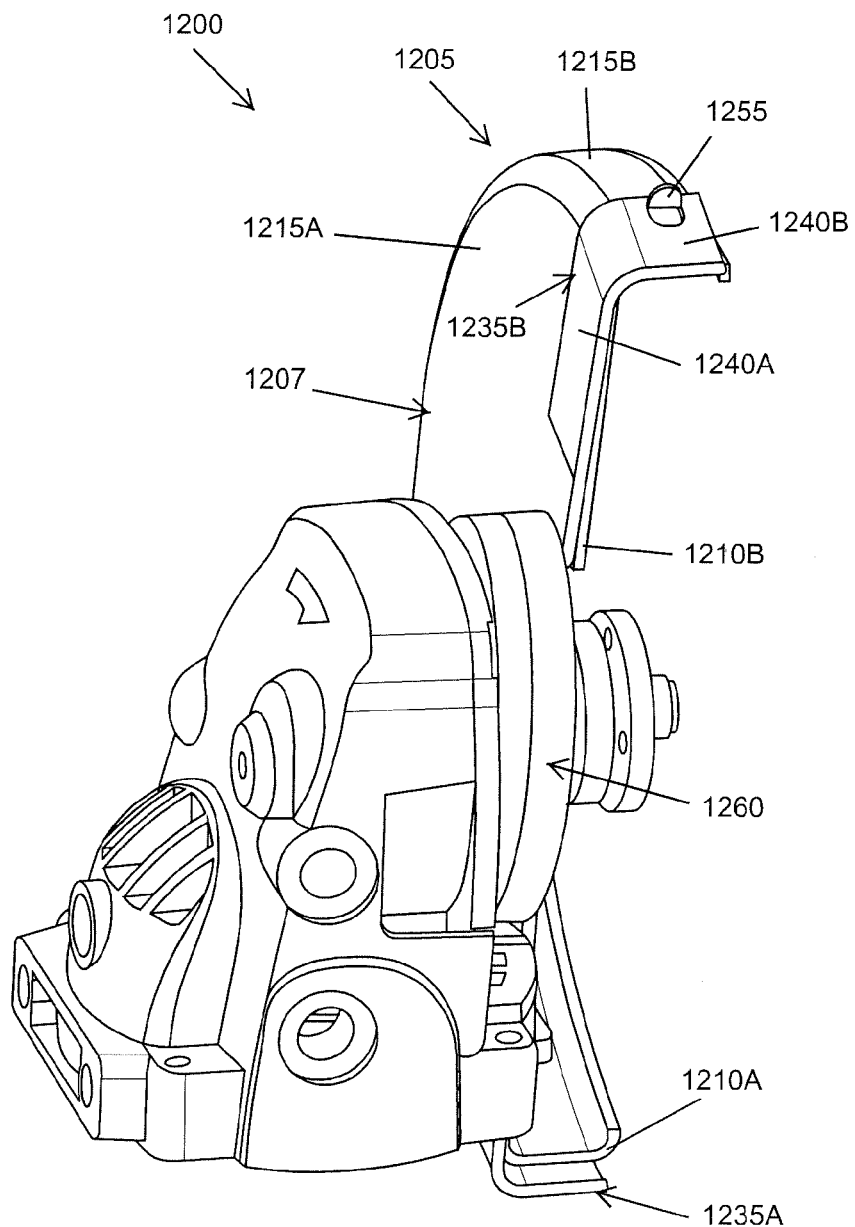
FIGS. 12A-12C illustrate views of a repositionable shield assembly in accordance with another embodiment of the invention.
Figure 12B:
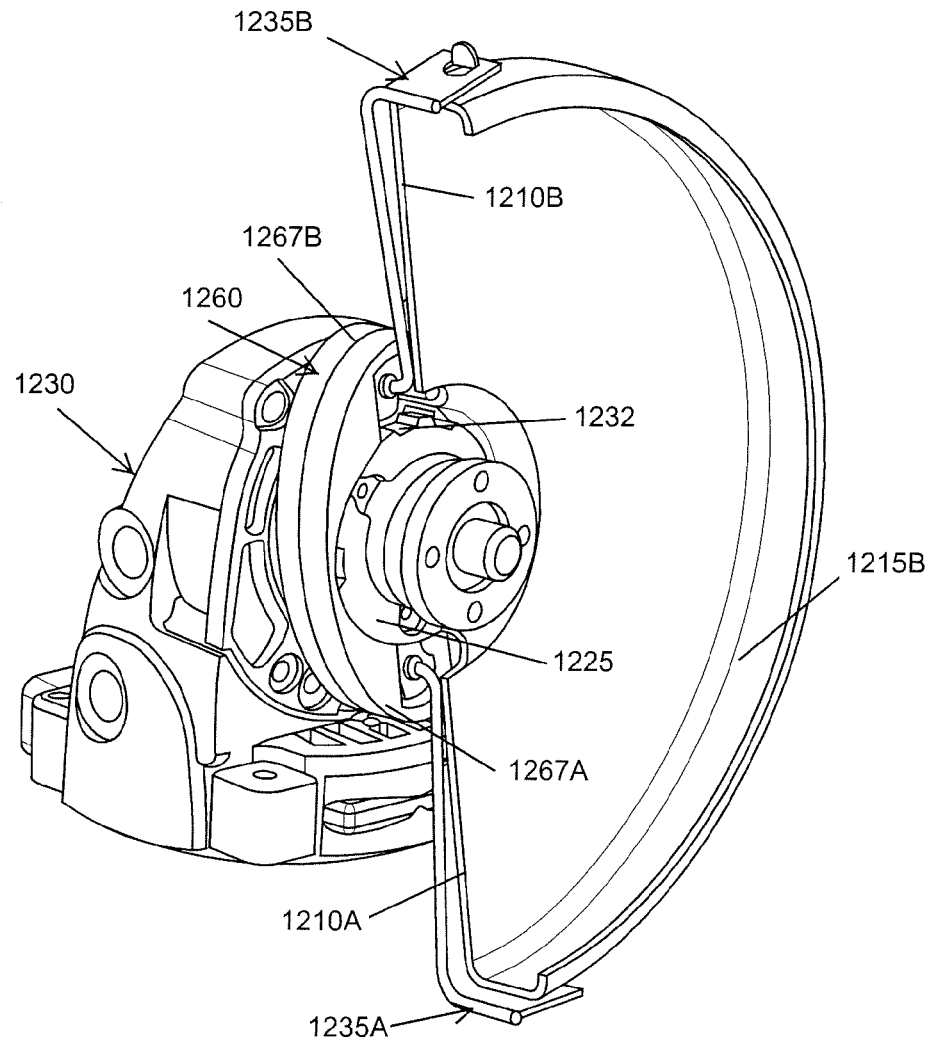
Figure 12C:
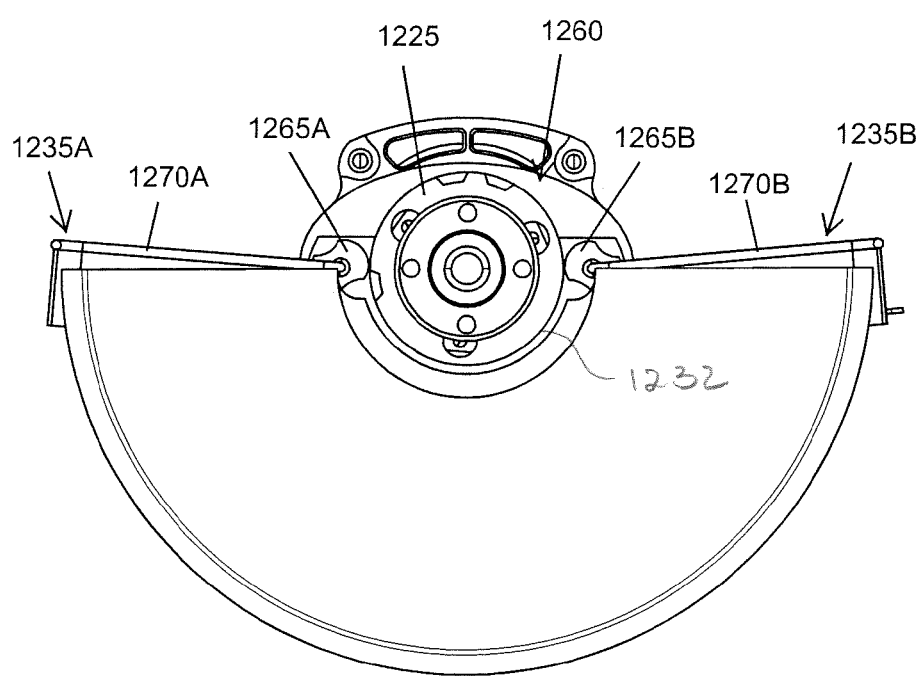

Another embodiment of the selectively repositionable shield assembly is illustrated in FIGS. 12A-12C. The shield assembly 1200 includes a guard member 1205 including a generally semicircular body 1107 defining a first end 1210A and a second end 1210B, and including a generally planar base portion 1215A and a transverse wall portion 1215B. The guard member 1205 further includes an annular collar 1220 operable to secure the shield assembly 1200 to the neck 1225 of the gear case cover 1230. The neck 1225 includes a plurality of axial notch surfaces 1232 disposed at selected locations along the collar perimeter.

A first sliding actuator 1235A is disposed along the first transverse end 1210A of the guard member 1205 and a second sliding actuator 1235B is disposed along the second transverse end 1210B of the guard member. The sliding actuator 1235A, 1235B defines a generally L-shaped structure including a long arm section 1240A and a distal short arm section 1240B disposed over the transverse wall portion 1215B of the guard 1205. The distal short arm section 1240B includes a tab 1255 extending radially outward therefrom. With this configuration, the each actuator 1235A, 1235B slides along the guard 1205 from an extended position, in which it protrudes beyond its respective guard body end 1210A, 1210B, to a retracted position, in which the actuator is generally flush with respect to guard body end.

A generally oblong outer collar 1260 surrounds the neck 1225. With this configuration, the outer collar defines an outer race and the neck 1225 defines an inner race. A first sprag 1265A, disposed along first collar end 1267A, is pivotally coupled to the outer collar 1260. Similarly a second sprag 1265B, disposed along the second collar end 1267B opposite the first collar end, is pivotally coupled to the outer collar 1260. By way of example, the first sprag 1265A may be diametrically opposed to the second sprag 1265B with respect to the neck 1225 (i.e., the first sprag is angularly spaced from the second pawl by approximately 180°). Each sprag 1265A, 1265B possesses an hour-glass or figure-eight structure. Each sprag 1265A, 1265 is configured to rotate from a first position, in which it engages a flange notch surface 1232 to a second position, in which it is disengaged from the notch surface. In addition, each sprag 1265A, 1265B is in communication (e.g., mechanically linked) to an associated actuator 1235A, 1235B. Specifically, the first actuator 1235A is connected to the first sprag 1265A via a first rod 1270A that forms the actuator. The first rod 1270A is coupled to the first sprag 1265A proximate the sprag central pivot point. Similarly, the second sprag 1265B is connected to the second actuator 1235B via a second rod 1270B, proximate the central pivot point of the second sprag. With this configuration, engaging an actuator 1235A, 1235B causes the actuator to rotate the sprag from its normal, engaged position to its disengaged position. Each actuator 1235A, 1235B is biased via a biasing member (e.g., a spring) such that once the actuator is disengaged, it returns to its normal (engaged) position.

The sprags 1265A, 1265B are arranged so that, in their normal position, the first sprag 1265A prevents rotation of the guard member 1205 in a first direction (e.g., a clockwise direction), while permitting rotation of the guard member in a second (opposite) direction (e.g., a counterclockwise direction). Similarly, the second sprag 1265B, in its normal position, prevents rotation of the guard member 1205 in the second direction, but permits rotation of the guard member in the first direction. In operation, to rotate the guard member 1205 in the first direction, a user bumps the first actuator 1235A against a surface such as the workpiece, causing the actuator to move along the guard member. The actuator 1235A, in turn (via rod 1270A), rotates the first sprag 1265A from its engaged to its disengaged position. Since the second sprag 1265B is already configured to allow the guard member 1205 to rotate in the first direction, the operator may now rotate the guard member in the first direction by continuing the application of force to the guard member 1205 via contact. Alternatively, to rotate the guard member 1205 in the second direction, the operator bumps the second actuator 1235B against an object (e.g., the work surface) to rotate the second sprag 1265B from its engaged position to its disengaged position. Since the first sprag 1265A is already configured to allow the guard member 1205 to rotate in the second direction, the operator may now rotate the guard in the second direction.

Another selectively repositionable shield assembly in illustrated in FIGS. 13A-13D. As shown, the shield assembly 1300 includes a guard member 1305 including a generally semicircular body 1307 defining a first end 1310A and a second end 1310B. The guard member 1305 includes a generally planar base portion 1315A oriented generally orthogonal to the rotational axis of the spindle 215 and a transverse portion 1315B oriented generally parallel to the rotational axis of the spindle. A generally annular guard collar 1320, extending upward from the guard member body 1307, includes a plurality of windows angularly spaced about the collar. By way of specific example, the guard collar 1320 may include a single rear window 1325A (disposed centrally along the rear semicircle defined by the collar) and a plurality of forward windows 1325B (disposed along the forward semicircle of defined by the collar).

Figure 13A:
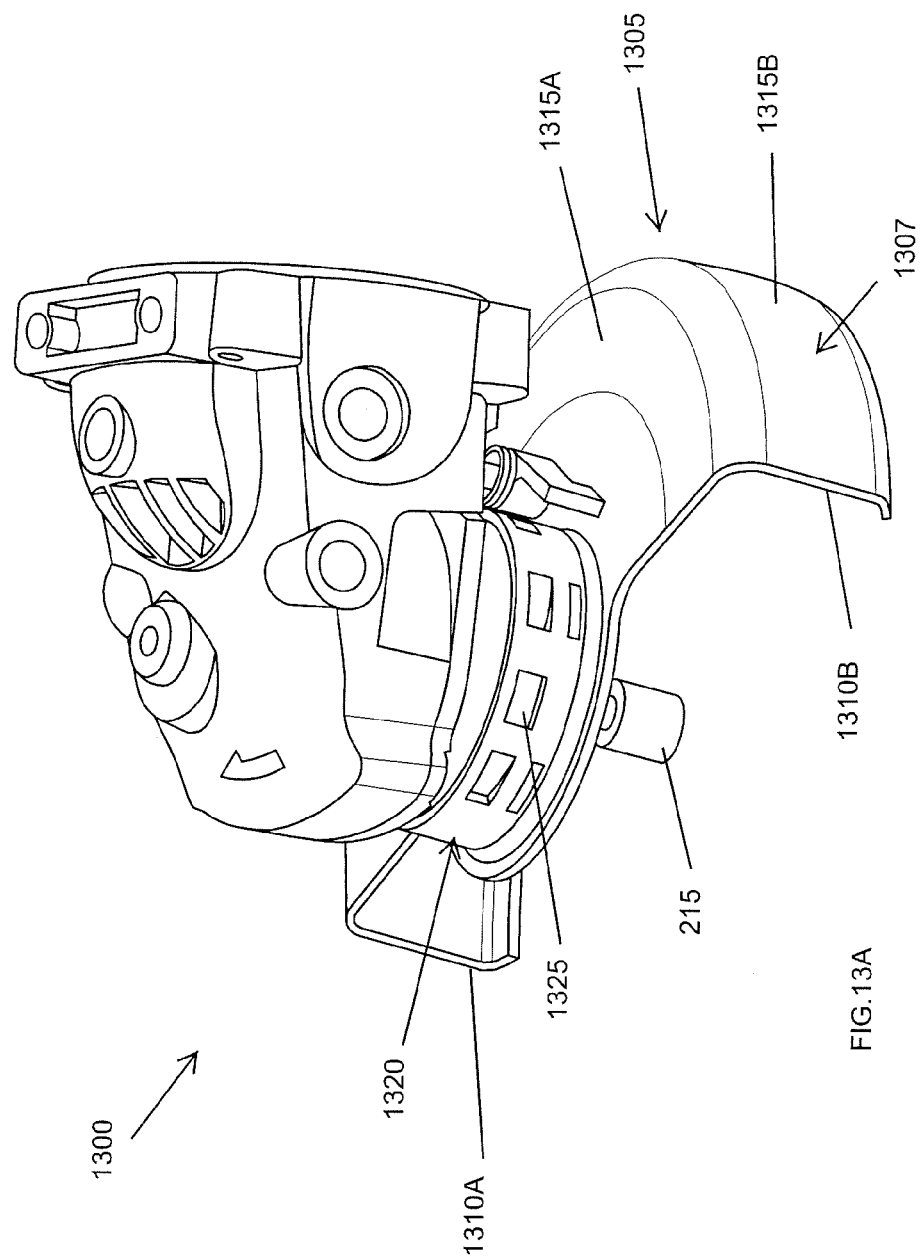
FIGS. 13A-13D illustrate views of a repositionable shield assembly in accordance with another embodiment of the invention.
Figure 13B:
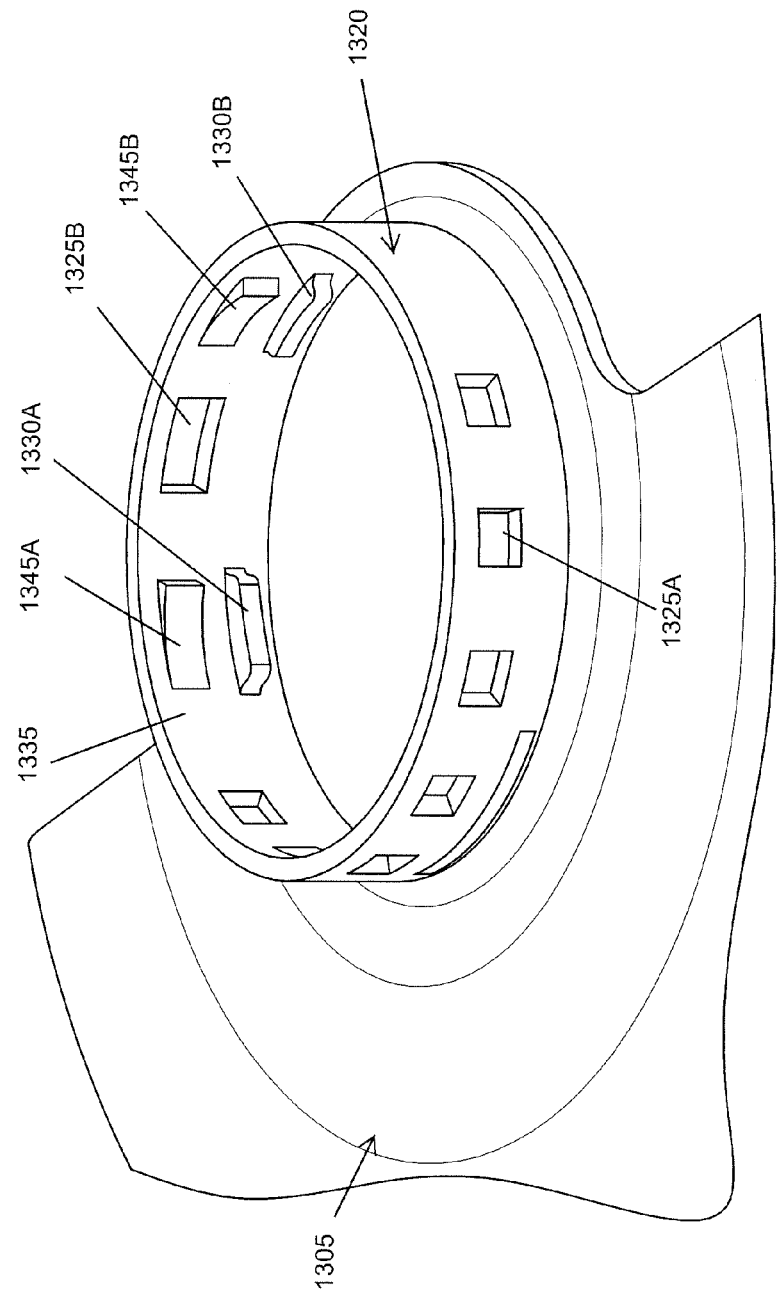

As seen best in FIG. 13B, the guard collar 1320 further includes one or more guide tabs 1330A, 1330B angularly spaced along the interior surface 1335 of the collar (e.g., disposed proximate the lower edge of the collar). The guide tabs 1330A, 1330B are received in and travel along an axial notch 1337 formed into the neck 1339 of the gear case cover 1340. The guide tabs 1330A, 1330B, moreover, move along a track 1342 formed into the circumference of the neck 1339.

In addition, the guard collar 1320 includes one or more guard springs 1345A, 1345B angularly spaced along guard collar interior surface 1335. In an embodiment, the guard springs 1345A, 1345B are generally vertically aligned with each guide tab 1330A, 1330B, each being spaced laterally from a corresponding side of the rear guard collar windows 1325B. The guard springs 1345A, 1345B are configured to remove clearance between the guard collar 1320 and the neck 1339 of the gear case cover 1340.

Figure 13C:
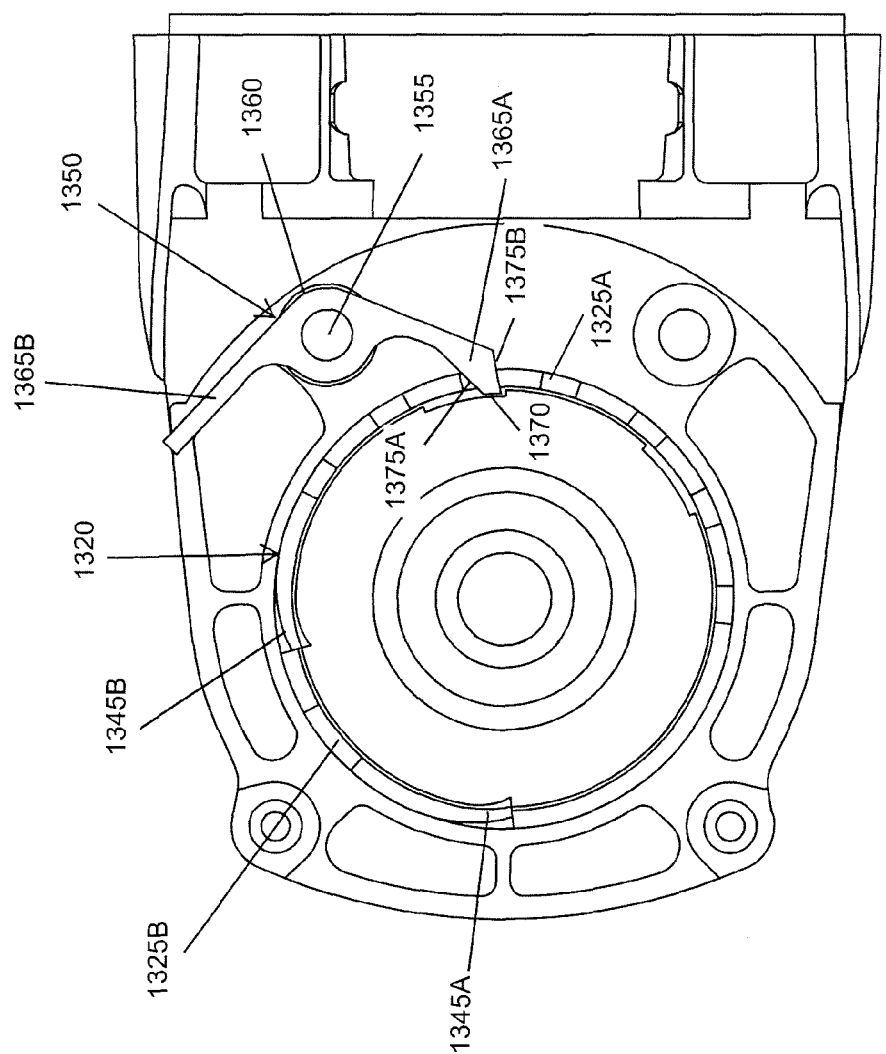
Figure 13D:
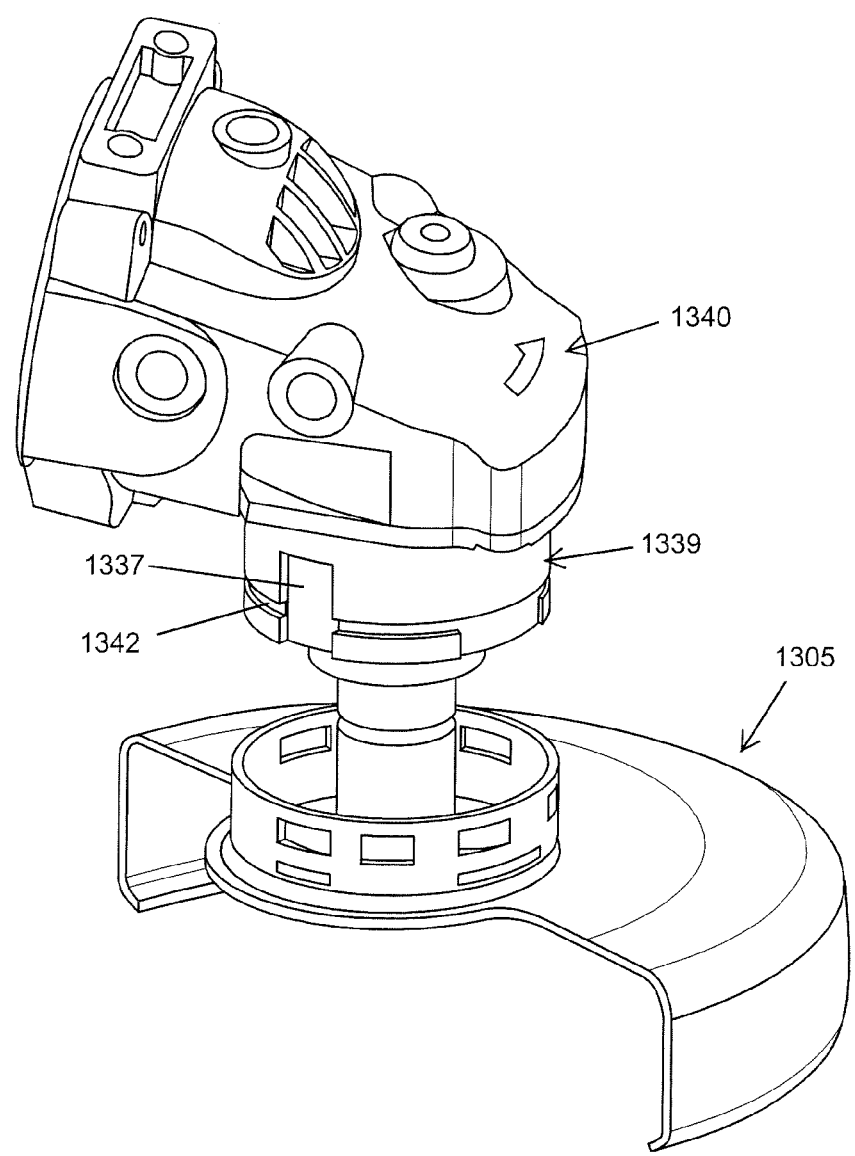

Referring to FIG. 13C, a stop lever 1350 is pivotably coupled to gear case cover 1340 via a fastener 1355. The stop lever 1355 is biased into engagement with the guard collar 1320 via a biasing member 1360 such as a spring. The stop lever is generally L-shaped, in including an engagement portion 1365A and a distal arm portion 1365B. The engagement portion 1365A is configured to pass through the windows 1325A, 1325B on the guard collar 1320; moreover, the end 1370 of the engagement portion 1365A is asymmetrically tapered, with an angled or ramped surface 1375A and a straight surface 1375B. With this configuration, when the engagement portion end 1370 is positioned within a collar window 1325A, 1325B, rotation of the collar is permitted in the direction of the angled surface 1375A, but is prevented in the direction of the straight surface 1375B.

In operation, the biasing member 1360 (e.g., a torsion spring) biases the stop lever 1350 (and, in particular, the engagement portion 1365A) into contact with the guard collar 1320. In this normal, engaged or locked position, the engagement portion 1365A is positioned within a collar window 1325A, 1325B, securing the rotational position of the guard collar 1320 (and thus the shield assembly 1300) relative to the working tool (e.g., a grinder disc). To reposition the guard member 1305 (i.e., to adjust the rotational position of the shield assembly 1300 with respect to the working tool), the user contacts the guard body end 1310A, 1310B against a surface to rotate the guard member in the direction of the stop lever angled surface 1375A with a force sufficient to overcome the biasing force of the biasing member. This, in turn, causes the guard collar 1320 to rotate about the neck 1339 of the gear case 1340 in the direction of the angled surface 1375A, with the guide tabs 1330A, 1330B sliding along track 1342. As the guard collar 1320 rotates, the engagement portion 1365A of the stop lever 1350 is driven radially outward, i.e., it is pivoted away from the guard collar. The collar continues to rotate until the engagement portion 1365A is aligned with the desired window 1325A, 1325B. Once aligned, the stop lever engages the neck 1339, returning the lock mechanism to its normal, engaged or locked position in which the shield assembly 1300 is secured in position. With this configuration, each window serves as a detent position, permitting a user to adjust the rotational position of the shield assembly 1300 along the neck 1339 in discrete increments.

Figure 14:
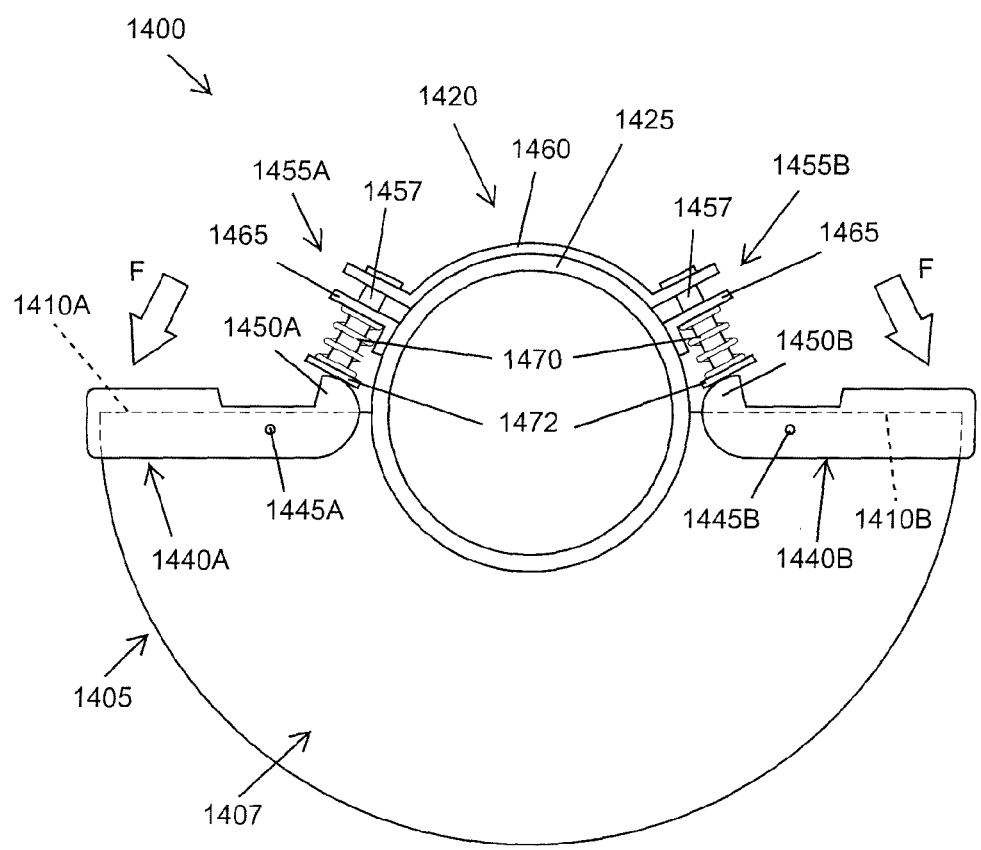
FIG. 14 illustrates a view of a repositionable shield assembly in accordance with another embodiment of the invention.

Another repositionable shield assembly in illustrated in FIG. 14. As shown, the shield assembly 1400 includes a guard member 1405 including a generally semicircular body 1407 defining a first end 1410A and a second end 1410B, as well as a generally planar base portion 1415A and a wall portion 1415B oriented transverse (generally orthogonal) to the base portion. The guard member 1405 further includes a generally guard collar lock mechanism 1420 operable to selective engage the neck 1425 of the gear case cover. The lock mechanism includes a bracket 1435 in communication with a first actuator 1440A disposed along the first guard body end 1410A and a second actuator 1440B disposed along second guard body end 1410B. In an embodiment, the first actuator 1440A is a lever pivotally coupled to the guard body 1407 at first pivot point 1445A. Similarly, the second actuator 1440B is a lever pivotally coupled to guard body 1407 at a second pivot point 1445B. The inner portion of the actuator 1440A, 1440B (i.e., the portion closes to the neck 1420) includes a protruding member or cam 1450A, 1450B that, when pivoted, alters the diameter of the bracket member 1435 to increase or decrease the clamping force exerted by the bracket on the neck 1425.

The bracket 1435 includes a first loaded fastener 1455A in communication with the first actuator 1440A and a second loaded fastener 1455B in communication with the second actuator 1440B. Each loaded fastener 1455A, 1455B includes a fastener 1457 (e.g., a bolt) couples a first or large bracket portion 1460 to a second or small bracket portion 1465 separable from the large bracket portion. A biasing member 1470 (e.g., a spring), positioned between the small bracket portion and a washer 1472 mounted on the shaft of the fastener, biases the bracket portions 1460, 1465 toward each other. As a result, in its normal position, the bracket 1435 is generally closed, applying clamping pressure sufficient to secure the rotational position of the shield assembly 1400 via frictional force.

In operation, engaging an actuator 1440A, 1440B (indicated by arrow F) pivots the actuator such that the cam 1450A, 1450B engages the washer 1472, overcoming the biasing force of the biasing member 1470 and driving the washer upward along the shaft of the fastener 1477 (toward the head of the fastener 1457). Movement of the washer 1472 compresses the biasing member 1470, thereby decreasing the clamping force applied by the bracket 1435. That is, compressing a biasing member 1470 separates the large bracket 1460 portion from the small bracket portion 1465. Once the clamping pressure is reduced, the shield assembly 1400 may be rotated about the neck 1425 to its desired rotational position. Releasing the actuator 1440A, 1440B permits the biasing member 1470 to expand, driving the actuator to its normal position and drawing the bracket portions 1460, 1465 together to increase the clamping pressure.

Figure 15A:
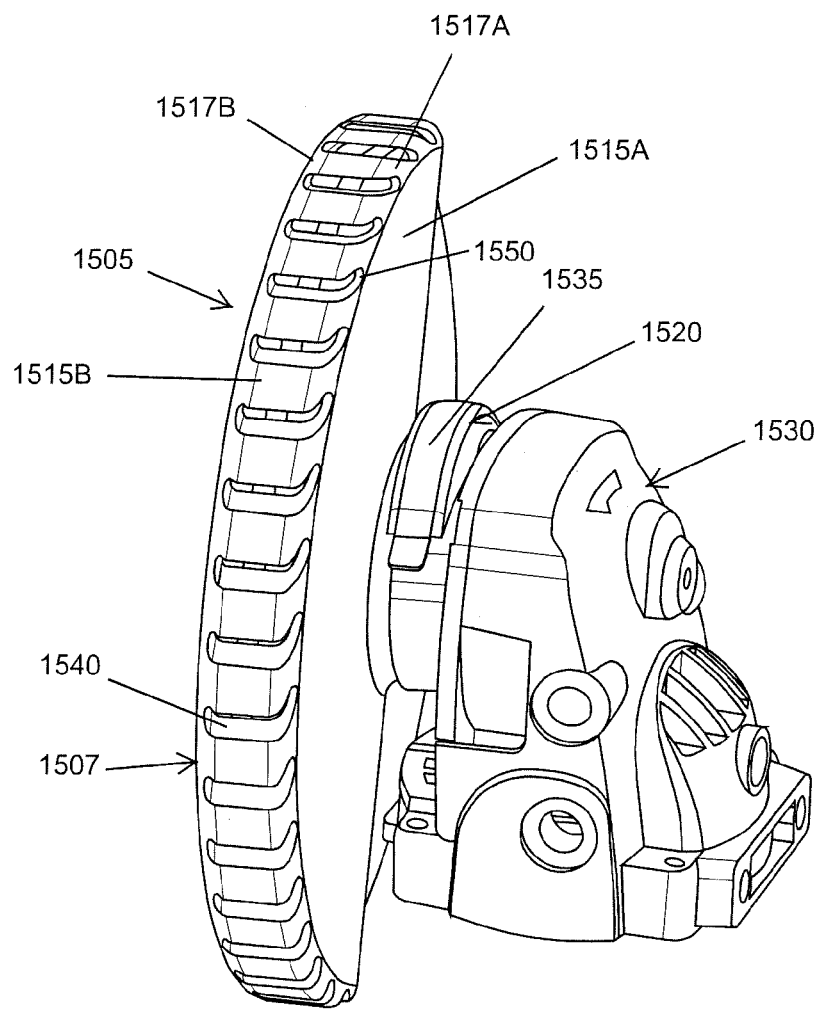
FIGS. 15A and 15B illustrate a see-through guard member in accordance with an embodiment of the invention.
Figure 15B:
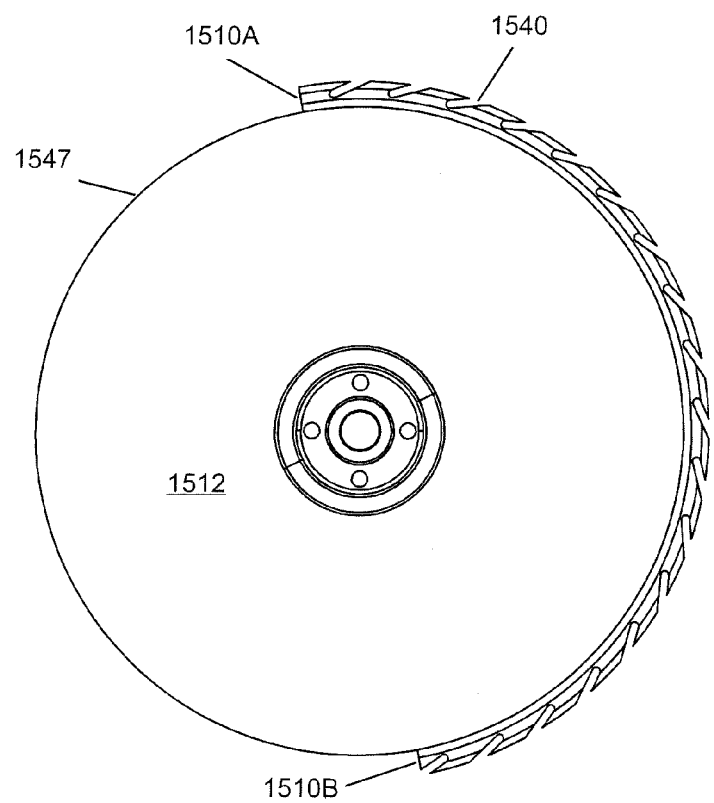

In another aspect of the invention, operator visibility of the working tool (e.g., a circular grinder) through the guard is provided, while the shielding ability of the guard is maintained. Referring to FIGS. 15A-15C, the shield assembly 1500 includes a guard member 1505 similar to that described above, including a generally semicircular body 1507 having a first end 1510A and a second end 1510B. The guard member 1505, configured to partially enclose the working tool 1512 (e.g., a grinder blade), includes a base portion 1515A and a transverse wall portion 1515B (e.g., transverse wall portion is oriented generally orthogonal to the base portion 1515B), as well as bevel portions 1517A, 1517B, similar to those described above. By way of example, the dimensions of the guard member 1405 are selected such that the guard covers approximately 180° of the grinding tool (a generally circular disc). The guard member 1505 further includes a generally annular guard collar 1520 operable to secure the shield assembly 1500 to the neck of the gear case cover 1530. Specifically, the guard collar 1520 includes a clamp mechanism 1535 that selective captures the shield assembly 1500 to the neck.

The guard member 1505 is configured to provide a see-through effect that enables an operator to view the working tool 1512 through the guard member during tool operation. Specifically, the guard member 1505 includes a plurality of apertures 1540 angularly spaced about the transverse wall portion 1515B at regular intervals. As shown, each aperture 1540 may be an elongated slot formed into the transverse wall portion 1515B, with each slot extending inboard from the guard member circumference. Each slot is oriented at an angle that is offset from 90° with respect to the transverse wall portion 1515B and/or the circumferential edge 1547 of the working tool 1512. In an embodiment, each slot 1540 is angled approximately 45° with respect to the transverse wall portion 1515B of guard body 1507. As shown, each slot 1540 extends into the transverse wall 1515C and beveled edges 1517A, 1517B, terminating in a generally rounded slot end 1550.

Figure 16A:
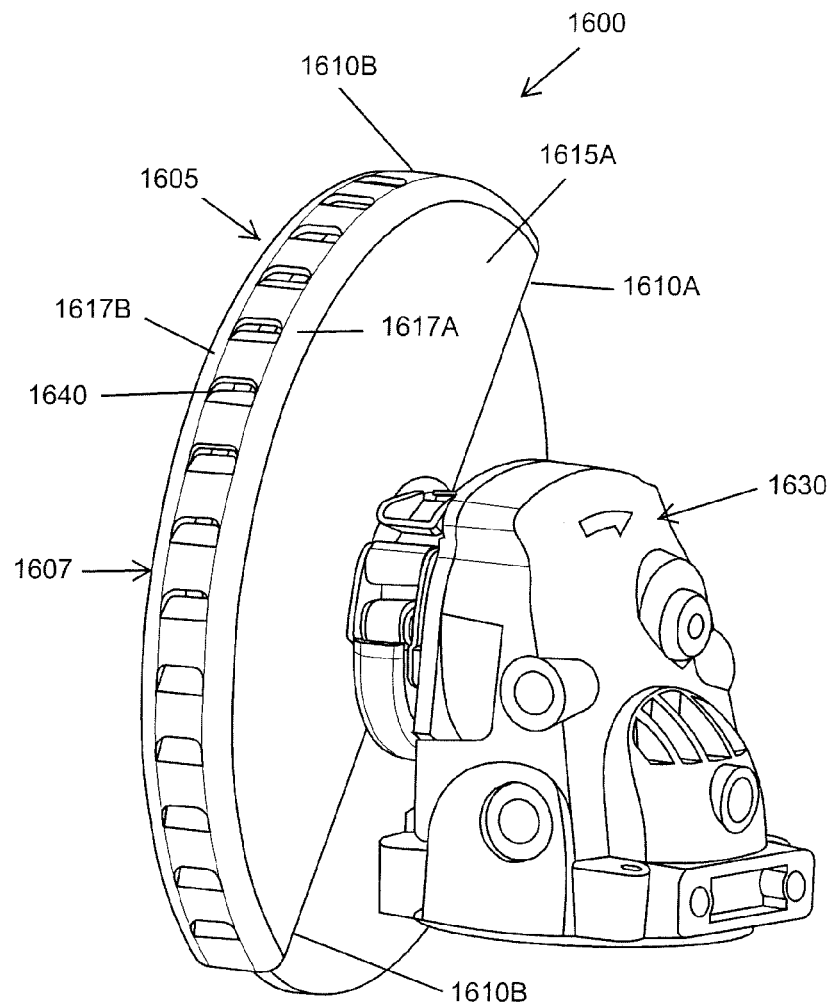
FIGS. 16A and 16B illustrate a see-through guard member in accordance with another embodiment of the invention.
Figure 16B:
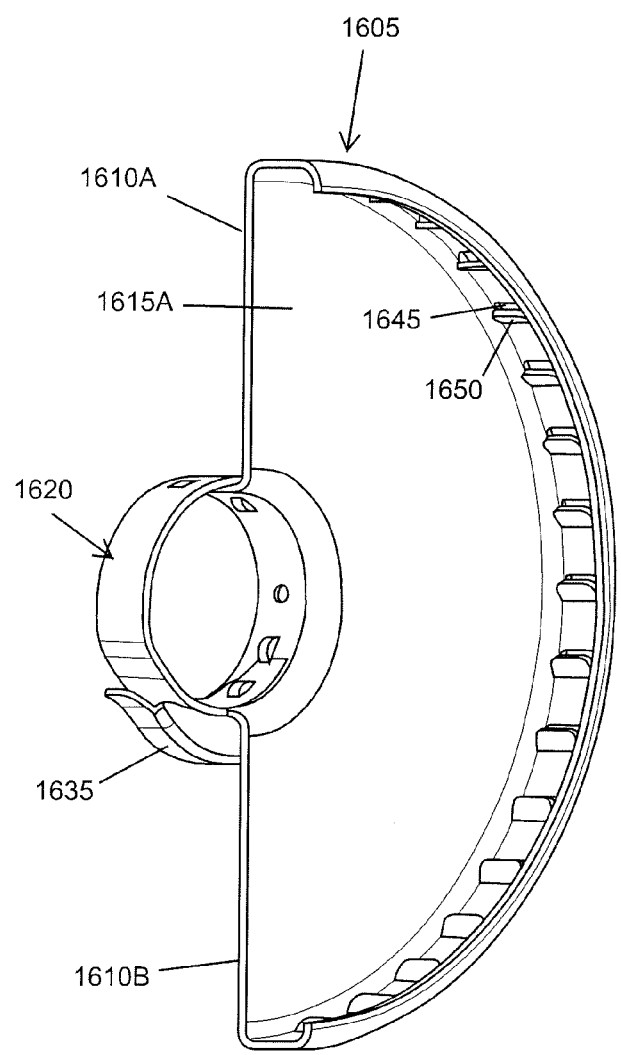

Another embodiment for a see-through shield assembly is illustrated in FIGS. 16A and 16B. As shown, the shield assembly 1600 includes a guard member 1605 similar to that described above, including a generally semicircular body 1607 having a first end 1610A and a second end 1615B, as well as including a neck portion 1615A, a generally planar base portion 1615B, and a transverse wall portion 1615C (e.g., transverse wall portion is oriented generally orthogonal to the base portion 1615B), as well as bevel portions 1617A, 1617B. The guard member 1605 further includes a generally annular guard collar 1620 operable to secure the shield assembly 1600 to the neck on the gear case cover 1630. Specifically, the guard collar 1620 includes a clamp mechanism 1635 that selectively captures the shield assembly 1600 to the tool device. In this embodiment, the apertures 1640 are in the form of a series of louvers including an opening 1645 and a U-shaped tab or tongue member 1650 extending angularly inward from the transverse wall portion 1615C. The tongue members 1650 are operable to deflect particulates, maintaining the particulates within the interior of the guard member 1605.

Figure 17A:
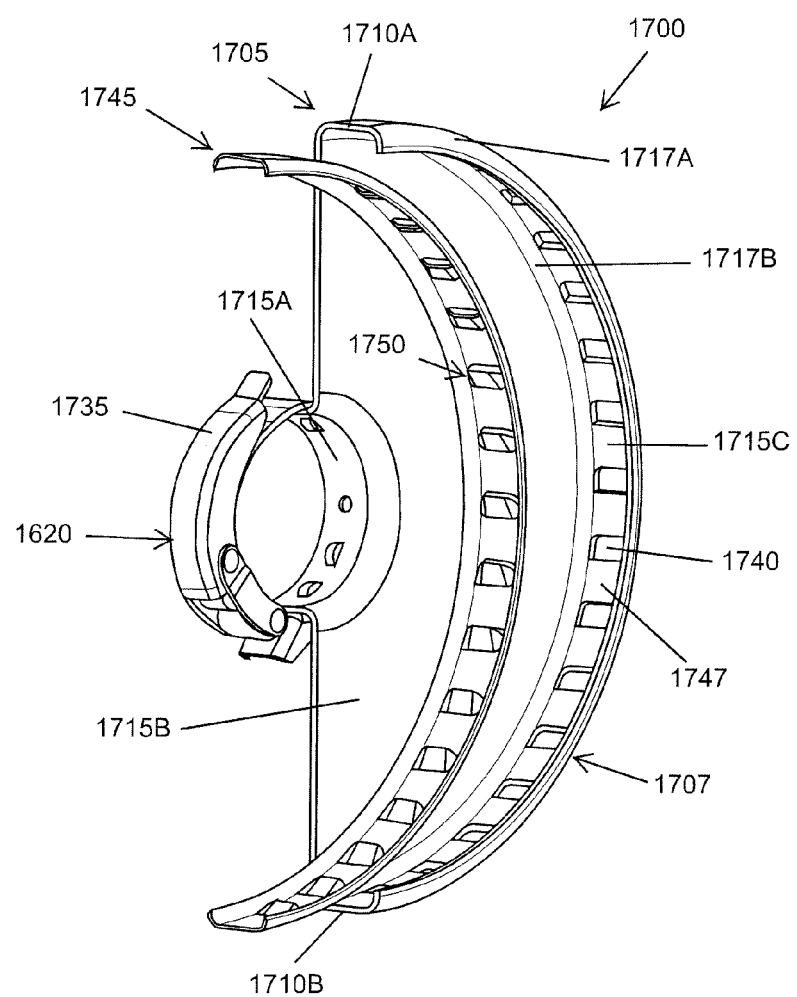
FIGS. 17A and 17B illustrate a see-through guard member in accordance with another embodiment of the invention.
Figure 17B:
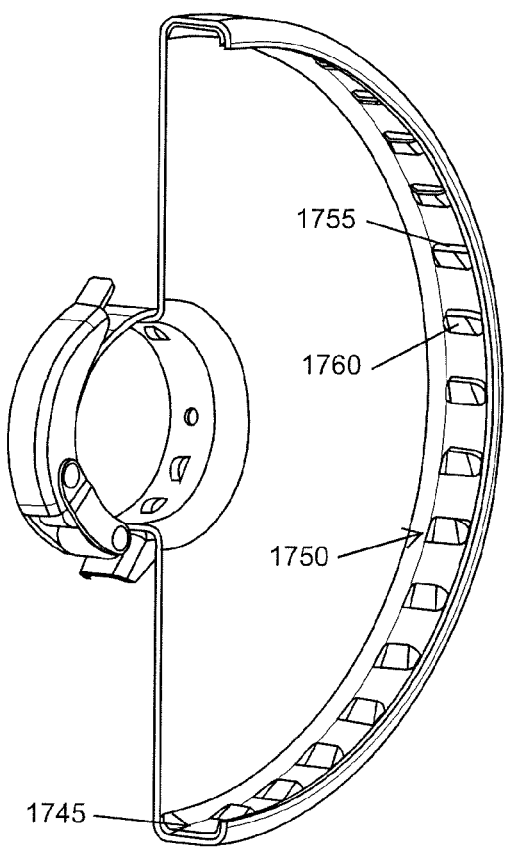

Another embodiment of the see-through shield assembly is illustrated in FIGS. 17A and 17B. As shown, the shield assembly 1700 includes a guard member 1705 similar to that described above, including a generally semicircular body 1707 having a first end 1710A and a second end 1710B, and including a neck portion 1715A, a generally planar base portion 1715B, and a transverse wall portion 1715C, as well as beveled portions 1717A, 1717B. The guard member 1705 further includes a generally annular guard collar 1720 operable to secure the shield assembly 1700 to the neck of the gear case cover (not illustrated). Specifically, the guard collar 1720 includes a clamp mechanism 1735 that selectively captures the shield assembly 1700 to the neck.

In this embodiment, the guard member apertures 1740 are in the form of generally rectangular holes or openings. The shield assembly 1700 further includes an elongated, generally U-shaped band 1745 adapted to fit within the generally U-shaped interior cavity 1747 defined by the transverse wall portion 1715C of the guard body 1707. The band 1745 includes a plurality of vents 1750 spaced longitudinally along the band. Each vent 1750 includes an opening 1755 and an angled baffle 1760 disposed at an angle with respect to the transverse wall portion 1715C of the guard member 1705. The vents 1750 are configured such that the vent opening 1755 aligns with a corresponding guard aperture 1740 formed into the transverse wall portion 1715C. The baffles 1760 cover the apertures 1740, deflecting the particulates, thereby maintaining the particulates within the guard member 1705. The band 1750 may be formed of the same or different material as the guard member 1705, and may be permanently or temporarily attached the guard member.

Thus, the present invention provides an accessible guard lock that provides a peripheral extension of a guard lock so that a user can hold the tool with both hands and engage/bump the peripheral extension on a surface (e.g., the work piece) to unlock the guard relative to the tool neck. Furthermore, the peripheral projections (the fingers) are positioned such that a bump of the peripheral projection also urged the guard in a direction of desired guard position. The accessible guard lock described above includes a pawl with two bosses that engage the shield assembly along two points of contact, namely, along the flange of the actuator and along the window of the collar. That bosses are effective radially offset with respect to the spindle. With this configuration, a user can adjust the position of the shield assembly about the spindle while the tool device is still in operation.

While the present invention has been described in detail and with reference to specific embodiments thereof, it will be apparent to one skilled in the art that various changes and modifications can be made therein without departing from the spirit and scope thereof. For example, regarding the repositionable shield assembly, each of the guard member, actuator, and the coupling ring may possess any suitable dimensions (size and/or shape) suitable for its described purpose. The degree of movement provided between the actuator and the coupling member is not particularly limited. While the repositionable assembly is illustrated without the see-through guard members, it should be understood that the see-through guard members may be incorporated in the repositionable shield assembly.

Regarding the see-through guard members, the apertures may be any suitable dimensions (size and/or shape) suitable for its described purpose. The guard members, moreover, may include any number of apertures disposed along its transverse wall portion. While a simple clamp is illustrated for clamping the shield assembly to the neck, other coupling mechanisms may be utilized, including the repositionable configurations described above.

Thus, it is intended that the present invention covers the modifications and variations of this invention provided they come within the scope of the appended claims and their equivalents. It is to be understood that terms such as "top", "bottom", "front", "rear", "side", "height", "length", "width", "upper", "lower", "interior", "exterior", and the like as may be used herein, merely describe points of reference and do not limit the present invention to any particular orientation or configuration.

We claim:

1. A handheld, powered tool device comprising:
    a housing;
    a motor disposed within the housing;
    a tool assembly including a spindle for supporting a working tool operable to act on a work surface, the spindle being driven by the motor;
    a shield assembly selectively rotatable relative to the tool comprising:
        a guard member operable to deflect debris generated by the working tool,
        an actuator movable relative to the tool housing; and
        a lock mechanism operable to secure the rotational position of the guard member with respect to the tool,
    wherein the actuator extends outward to an outer periphery of the tool so that the actuator can be moved relative to the tool by forceful contact of an external object; and
    wherein the forceful contact also unlocks the lock mechanism permitting the guard to rotate and rotates the guard relative to the tool.

2. The tool device of claim 1 further comprising a coupling member to couple the guard member to the housing.

3. The tool device of claim 2, wherein:
    the coupling member comprises:

a generally annular body having an outer circumferential surface,
a plurality of windows angular spaced about the body, and
a male connector extending radially from the outer circumferential surface; and
the actuator comprises a female connector operable to mate with the male connector such that the actuator is rotatably coupled to the coupling member.

4. The tool device of claim 2, further comprising an alignment system in communication with the coupling member and the actuator, wherein the alignment system is operable to orient the actuator in a predetermined position relative to the coupling member.

5. The tool device of claim 1, wherein the forceful contact acts on the actuator in a direction and rotates the guard in the direction.

6. The tool device of claim 1, wherein the housing comprises a gear case having a gear case cover including a neck surrounding the spindle, the neck including a continuous groove extending about neck circumference.

7. The tool device of claim 1, wherein:
the device further comprises the lock mechanism operable to secure the shield assembly in a selected rotational position with respect to the spindle; and
moving the actuator with respect to the coupling member releases the lock mechanism to permit rotation of the shield assembly about the spindle.

8. The tool device of claim 1, wherein the actuator is rotatable about the coupling member.

9. The tool device of claim 8, wherein:
the actuator comprises a plurality engagement notches angularly spaced about the actuator;
the coupling member comprises a plurality of windows; and
the alignment system aligns each of the plurality of engagement notches with a corresponding window on the coupling member.

10. The tool device of claim 9, wherein the tool device further includes the lock mechanism, the lock mechanism comprising a pawl pivotably coupled to the housing, the pawl including a first boss to engage an engagement notch and a second boss configured to engage a window of the coupling member.

11. The tool device of claim 1, wherein the guard member comprises:
a generally planar base portion oriented generally orthogonal to spindle rotational axis;
a transverse wall portion oriented generally parallel to the spindle; and
a plurality of apertures spaced longitudinally along the transverse wall portion of the guard member.

12. The tool device of claim 11, wherein the plurality of apertures includes one or more slots extending at an angle with respect to the transverse wall portion.

13. A handheld, powered tool device comprising:
a housing including a neck portion;
a motor disposed within the housing;
a tool assembly including a spindle for supporting a working tool operable to act on a work surface, the spindle passing through the neck portion of the housing, wherein the spindle is in communication with the motor;
a shield assembly rotatably coupled to the neck portion of the housing, the shield assembly being selectively repositionable with respect to the spindle, the shield assembly comprising:
a guard member to partially covering the working tool,
a generally annular coupling member to couple the guard member to the neck portion of the housing, and
an actuator coupled to the guard member, the actuator being rotatable about the coupling member; and
a lock mechanism operable in a locked position, in which the lock mechanism engages the coupling member to secure the rotational position of the shield assembly with respect to the spindle, and in an unlocked position, in which the lock mechanism disengages the coupling member to permit rotation of the shield assembly about the neck portion of the housing,
wherein rotation of the actuator about the coupling member moves the lock mechanism from its locked position to its unlocked position.

14. The tool device of claim 13, wherein the actuator comprises a flange comprising a plurality engagement notches angularly spaced about circumference of the flange.

15. The tool device of claim 14, wherein:
the coupling member comprises a plurality of windows;
the lock mechanism comprises a pawl pivotably coupled to the housing; and
the pawl includes a first boss to engage one of the plurality of engagement notches disposed on the actuator and a second boss configured to engage one of the plurality of coupling member windows.

16. The tool device of claim 15, wherein:
the shield assembly comprises an alignment system operable to orient the actuator in a predetermined position with respect to the coupling member; and
each of the plurality of windows aligns with a corresponding notch of the plurality of notches when the actuator is aligned in the predetermined position.

17. The tool device of claim 15, wherein the alignment system comprises a biasing member to bias the actuator in the predetermined position with respect to the coupling member.

18. The tool device of claim 13, wherein the guard member comprises:
a generally planar base portion oriented generally orthogonal to spindle rotational axis;
a transverse wall portion oriented generally parallel to the spindle; and
a plurality of apertures spaced longitudinally along the transverse wall portion of the guard member.

19. A method of selectively adjusting a shield assembly on a grinding tool, the method comprising:
obtaining grinding tool comprising a motor disposed within a housing, a grinding disc in communication with the motor, and a shield assembly repositionable with respect to the grinding disc, the shield assembly including a guard member partially covering the grinder disc and an actuator rotatable relative to the grinding tool; and a lock mechanism operable in a locked position, in which the lock mechanism engages the guard member to secure the rotational position of the guard member with respect to the grinding disc, and in an unlocked position, in which the lock mechanism disengages the guard member to permit repositioning of the guard member with respect to the grinding disc; and
contacting the actuator against a work surface to release the lock mechanism from its locked position and to simultaneously adjust the position of the guard member.

20. The method claim 19, wherein:
the actuator comprises a protruding element extending beyond the periphery of the guard member;

the method further comprises contacting the protruding element against the work surface to move the actuator from a first actuator position to a second actuator position;

in the first actuator position, the lock mechanism is in its locked position; and in the second actuator position, the lock mechanism is in its unlocked position.

\* \* \* \* \*